(12) United States Patent
Nagatsu et al.

(10) Patent No.: US 8,368,824 B2
(45) Date of Patent: Feb. 5, 2013

(54) LIQUID CRYSTAL DISPLAY APPARATUS AND PROJECTOR

(75) Inventors: Takuro Nagatsu, Matsumoto (JP); Takashi Endo, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 421 days.

(21) Appl. No.: 12/683,864

(22) Filed: Jan. 7, 2010

(65) Prior Publication Data

US 2010/0182519 A1    Jul. 22, 2010

(30) Foreign Application Priority Data

Jan. 22, 2009 (JP) ................................ 2009-011680
Jan. 22, 2009 (JP) ................................ 2009-011681

(51) Int. Cl.
*G02F 1/1335* (2006.01)
(52) U.S. Cl. .......................................................... 349/9
(58) Field of Classification Search ........................ 349/9
See application file for complete search history.

(56) References Cited

U.S. PATENT DOCUMENTS

| 6,414,781 | B1 | 7/2002 | Saitoh |
| 6,819,464 | B2 | 11/2004 | Fujimori et al. |
| 2006/0262233 | A1 | 11/2006 | Uehara et al. |
| 2008/0068546 | A1 | 3/2008 | Ninomiya et al. |
| 2010/0165220 | A1 * | 7/2010 | Endo et al. ................... 349/8 |

FOREIGN PATENT DOCUMENTS

| JP | A-2000-284700 | 10/2000 |
| JP | A-2004-21056 | 1/2004 |
| JP | A-2004-117580 | 4/2004 |
| JP | A-2004-198650 | 7/2004 |
| JP | A-2004-341180 | 12/2004 |
| JP | A-2005-189487 | 7/2005 |
| JP | A-2006-350291 | 12/2006 |
| JP | A-2008-76592 | 4/2008 |
| WO | WO 2005/064387 A1 | 7/2005 |

* cited by examiner

*Primary Examiner* — Phu Vu
(74) *Attorney, Agent, or Firm* — Oliff & Berridge, PLC

(57) ABSTRACT

A liquid crystal display device includes: a liquid crystal device; a first dust-proof plate made of a birefringent material, and disposed on one of a light entrance side and a light exit side of the liquid crystal device; and a second dust-proof plate made of an isotropic refractive material, and is disposed on the other of the light entrance side and the light exit side of the liquid crystal device.

12 Claims, 14 Drawing Sheets

LIQUID CRYSTAL DISPLAY APPARATUS AND PROJECTOR

BACKGROUND

1. Technical Field

The present invention relates to a liquid crystal display device for forming an image, and a projector incorporating the liquid crystal display device.

2. Related Art

As a liquid crystal display device to be incorporated in a projector or the like, there exists a liquid crystal display device with a configuration of having dust-proof glass attached to each of the outer surfaces (a light beam entrance side end face and a light beam exit side end face) of a substrate of a liquid crystal device (see, e.g., JP-A-2004-341180). The dust-proof glass is formed, for example, of sapphire, quartz, quartz crystal, or fluorite. In conjunction with the development of a high-brightness product, there arises the case in which if the dust-proof glass is made of quartz with small linear expansion coefficient, the temperature of the liquid crystal device rises to influence the accuracy thereof. In contrast, since quartz crystal and sapphire have a high thermal conductivity, it is possible to enhance heat radiation from the liquid crystal device to which the dust-proof glass is attached. As a similar liquid crystal display device, there exists a device having the dust-proof glass disposed on the light entrance side and the dust-proof glass disposed on the light exit side be formed of quartz crystal plates (see, e.g., JP-2004-117580).

Further, as a liquid crystal display device having the dust-proof glass made of quartz glass, there exists a device provided with a compensation element made, for example, of sapphire disposed between the liquid crystal device and an exit side polarization plate, thereby compensating the pretilt of the liquid crystal (see, e.g., JP-A-2004-198650). Further, as a liquid crystal display device having the dust-proof glass, there exists a device having the configuration in which a microlens array is disposed on the light entrance side of the liquid crystal device, and the dust-proof glass is attached on the outer surface of the substrate of the liquid crystal device in order for enhancing the efficiency of the incident light (see, e.g., JP-A-2008-76592).

However, since the quartz crystal and sapphire for forming the dust-proof plate with a high cooling efficiency are birefringent materials, polarized light other than the linear polarized light having a polarization axis parallel or perpendicular to the optic axis of such a dust-proof plate is provided with a retardation in phase when passing through the dust-proof plate. In such a case, the contrast of the display image might be lowered due to the unintended retardation influence of the dust-proof plate.

SUMMARY

An advantage of some aspects of the invention is to provide a liquid crystal display device provided with a dust-proof plate, and capable of preventing the degradation of the contrast of a display image while preventing the temperature rise of the liquid crystal device.

Another advantage of some aspects of the invention is to provide a projector incorporating the liquid crystal display device described above.

A liquid crystal display device according to an aspect of the invention includes a liquid crystal device, a first dust-proof plate made of a birefringent material, and disposed on one of a light entrance side and a light exit side of the liquid crystal device, and a second dust-proof plate made of an isotropic refractive material, and is disposed on the other of the light entrance side and the light exit side of the liquid crystal device.

In the liquid crystal display device described above, by using the first dust-proof plate made of the birefringent material with a high thermal conductivity on one of the light entrance side or the light exit side of the liquid crystal device, the cooling effect of the liquid crystal device can be enhanced. Further, by using the second dust-proof plate made of the isotropic refractive material on the other side thereof, it is possible to prevent that the retardation influence of varying the polarization state of the light beam is exerted on the light beam passing through the second dust-proof plate. In the case of the dust-proof plate made of the birefringent material, while enhancing the cooling effect of the object having contact with the dust-proof plate with the high thermal conductivity, the polarization state of the light transmitted through the birefringent material is varied in accordance with the angle of the light transmitted therethrough with respect to the optic axis of the birefringent material and the angle of the polarization axis of the light transmitted therethrough with respect to the optic axis of the birefringent material. Therefore, in the liquid crystal display device, compared to the case of disposing the dust-proof plates made of the birefringent material on both of the light entrance side and the light exit side of the liquid crystal device, the polarization state of one of the light entering the liquid crystal device and the light emitted from the liquid crystal device is not varied, and further, the cooling effect of the liquid crystal device can be enhanced compared to the case of disposing the dust-proof plates made of the isotropic material on both of the light entrance side and the light exit side of the liquid crystal device.

Further, according to a specific aspect of the invention, in the liquid crystal display device described above, the first dust-proof plate is disposed on the light entrance side of the liquid crystal device, and the liquid crystal device further includes a microlens array at a portion on the light entrance side. In this case, the efficiency of the incident light can be enhanced by the microlens array.

Further, according to another aspect of the invention, the liquid crystal display device is further provided with a compensation element disposed across the liquid crystal device from the first dust-proof plate. In this case, since the light passing through the dust-proof plate made of the birefringent material is the light before passing through the liquid crystal device and the compensation element, or the light after passing through the liquid crystal device and the compensation element, it is possible to prevent that the retardation in phase is provided in displaying an all-black image due to the individual action of either one of the liquid crystal device and the compensation element. In other words, it is possible to avoid that the light other than the linear polarized light having the polarization axis parallel or perpendicular to the optic axis of the dust-proof plate made of the birefringent material is transmitted when displaying the all-black image. Thus, the degradation of the contrast of the display image can be prevented. It should be noted that in the case in which the liquid crystal device is further provided with the microlens array at the portion on the light entrance side, if the compensation element is disposed on the light exit side of the liquid crystal device, the incident angle distribution (light distribution) of the light become substantially the same between when passing through the liquid crystal of the liquid crystal device and when passing through the compensation element, thus the degradation of the contrast of the display image can be prevented.

Further, according to still another aspect of the invention, the liquid crystal display device described above further includes a compensation element disposed between the liquid crystal device and the first dust-proof plate. In this case, by adopting the layout of disposing the compensation element between the first dust-proof plate and the liquid crystal device, it becomes possible to input the light beam, which is transmitted through the compensation element, to the liquid crystal device while avoiding the transmission through the first dust-proof plate, or to input the light beam modulated by the liquid crystal device into the compensation element while avoiding the transmission through the first dust-proof plate. In other words, it can be prevented that the compensation operation of the compensation element to the liquid crystal device is hindered by the first dust-proof plate. Thus, the degradation of the contrast of the display image can be prevented.

Further, according to yet another aspect of the invention, the first dust-proof plate is made of one of quartz crystal and sapphire. In this case, it is possible to reliably cool the liquid crystal device while preventing the loss of the light intensity due to the first dust-proof plate. It should be noted that the thermal conductivity of the birefringent material substrate is preferably equal to or greater than 5 W/mk.

Further, according to still yet another aspect of the invention, the liquid crystal device has a pair of substrates adapted to hold a liquid crystal layer on both sides of the liquid crystal layer, and a displaying electrode formed on one of the pair of substrates.

Further, according to further another aspect of the invention, the liquid crystal display device described above further includes an entrance-side polarization plate disposed on a light entrance side of the liquid crystal device, and an exit-side polarization plate disposed on a light exit side of the liquid crystal device across the liquid crystal device, the first dust-proof plate, and the second dust-proof plate from the entrance-side polarization plate. In this case, the liquid crystal device is a transmissive light modulation device, and the entrance-side polarization plate on the light entrance side adjusts the polarization direction of the illumination light entering the liquid crystal device, and at the same time, the exit-side polarization plate on the light exit side takes out the modulated light with a predetermined polarization direction from the light emitted from the liquid crystal device.

Further, according to still further another aspect of the invention, a direction of an optic axis of the first dust-proof plate is one of parallel and perpendicular to a direction of an absorption axis of the entrance-side polarization plate. In this case, the light beam input to the liquid crystal display device displaying the all-black image is hardly influenced by the birefringent action in the first dust-proof plate when passing through the both polarization plates. Therefore, the phenomenon that the modulated light having the amount of modulation shifted from the correct value due to the refractive index anisotropy of the first dust-proof plate is emitted can be prevented.

In view of the problems described above, a projector according to yet further another aspect of the invention includes the liquid crystal display device described above, an illumination device adapted to illuminate the liquid crystal display device, and a projection lens adapted to project an image formed by the liquid crystal display device.

The projector described above is provided with the liquid crystal display device according to the aspects of the invention described above, and since the contrast can be made preferable while preventing the temperature rise in the liquid crystal display device, a high quality image can be projected.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
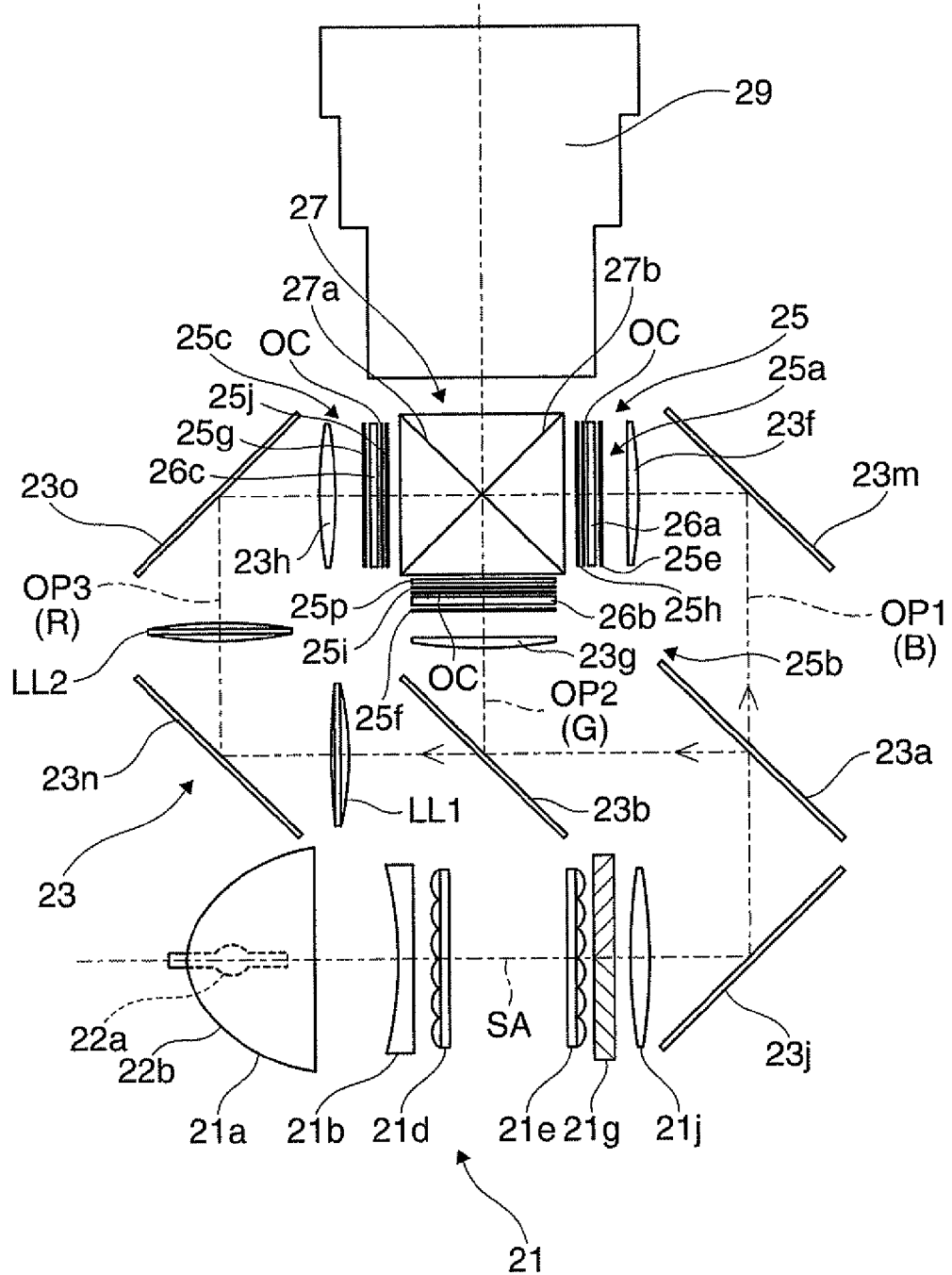
FIG. 1 is a diagram for explaining an optical system of a projector incorporating a liquid crystal display device according to a first embodiment of the invention.

FIG. 1 is a conceptual diagram for explaining a configuration of an optical system of a projector incorporating a liquid crystal display device according to a first embodiment of the invention.

The present projector 10 is provided with a light source device 21 for generating source light, a color separation optical system 23 for separating the source light from the light source device 21 into three light beams of respective colors of blue, green, and red, a light modulation section 25 illuminated by the illumination light beams of the respective colors emitted from the color separation optical system 23, a cross dichroic prism 27 for combining image light beams of the respective colors emitted from the light modulation section 25, and a projection lens 29 for projecting the image light beams passing through the cross dichroic prism 27 on a screen (not shown).

In the projector 10 described above, the light source device 21 is provided with a light source lamp 21a, a concave lens 21b, a pair of lens arrays 21d, 21e, a polarization conversion member 21g, and an overlapping lens 21i. Among these components, the light source lamp 21a is provided with a lamp main body 22a such as a high-pressure mercury lamp, and a concave mirror 22b for collecting the source light and emitting it forward. The concave lens 21b, which has a role of collimating the source light from the light source lamp 21a, can also be eliminated in the case in which, for example, the concave mirror 22b is a paraboloidal mirror. Each of the pair of lens arrays 21d, 21e is composed of a plurality of element lenses arranged in a matrix, and divides the source light, which is emitted from the light source lamp 21a and passes through the concave lens 21b, with these element lenses to be individually collected or diffused. The polarization conversion member 21g is provided with a prism array incorporating a PBS and a mirror, and a wave plate array attached on an exit surface, which is provided to the prism array, in a striped manner, although detailed explanations thereof will be omitted. The polarization conversion member 21g converts the source light emitted from the lens array 21e into only the linear polarized light having a first polarization direction parallel to, for example, the sheet of FIG. 1, and supplies it to the subsequent optical system. The overlapping lens 21i appropriately collects the illumination light passing through the polarization conversion member 21g as a whole, thereby making it possible to illuminate the liquid crystal light valves 25a, 25b, and 25c of the respective colors provided to the light modulation section 25 in an overlapping manner. Specifically, the illumination light passing through the both lens arrays 21d, 21e and the overlapping lens 21i evenly illuminates the liquid crystal panels 26a, 26b, and 26c of the respective colors disposed in the light modulation section 25 in an overlapping manner after passing through the color separation optical system 23 described below in detail.

The color separation optical system 23 is provided with first and second dichroic mirrors 23a, 23b, field lenses 23f, 23g, and 23h, and reflecting mirrors 23j, 23m, 23n, and 23o, and constitutes the illumination device together with the light source device 21. Here, the first dichroic mirror 23a transmits, for example, blue light out of the light of three colors of blue, green, and red, and reflects the green (G) light and the red (R) light. Further, the second dichroic mirror 23b reflects, for example, the green (G) light out of the incident light of the two colors of green and red, and transmits the red (R) light. Thus, the B light, the G light, and the R light constituting the source light are led respectively to first, second, and third optical paths OP1, OP2, and OP3, and respectively enter different illumination objects. In a specific explanation, the source light from the light source device 21 enters the first dichroic mirror 23a with the optical path folded by the reflecting mirror 23j. The B light transmitted through the first dichroic mirror 23a enters the field lens 23f opposed to the liquid crystal light valve 25a via the reflecting mirror 23m. Further, the G light, which is reflected by the first dichroic mirror 23a, and further reflected by the second dichroic mirror 23b, enters the field lens 23g opposed to the liquid crystal light valve 25b. Further, the R light transmitted through the second dichroic mirror 23b enters the field lens 23h opposed to the liquid crystal light valve 25c via the lenses LL1, LL2, and the reflecting mirrors 23n, 23o. It should be noted that the field lenses 23f, 23g, and 23h have a function of controlling the incident angles of the illumination light entering the liquid crystal light valves 25a, 25b, and 25c, respectively. The lenses LL1, LL2 and the field lens 23h constitute a relay optical system. The relay optical system has a function of transmitting the image in the first lens LL1 to the vicinity of the field lens 23h via the second lens LL2 without any substantial modification.

The light modulation section 25 is provided with the three liquid crystal light valves 25a, 25b, and 25c corresponding to the three optical paths OP1, OP2, and OP3 for the respective colors described above. Each of the liquid crystal light valves 25a, 25b, and 25c is a passive light modulation device for modulating the spatial distribution of the intensity of the incident illumination light.

Here, the B light liquid crystal light valve 25a disposed on the first optical path OP1 is an embodiment of the liquid crystal display device, and is provided with a liquid crystal panel 26a illuminated by the B light, a first polarization plate 25e as an entrance side polarization plate disposed on an entrance side of the liquid crystal panel 26a, a second polarization plate 25h as an exit side polarization plate disposed on an exit side of the liquid crystal panel 26a, and an optical compensation plate OC disposed between the liquid crystal panel 26a and the second polarization plate 25h. The liquid crystal light valve 25a is disposed on a subsequent stage of the field lens 23f provided to the color separation optical system 23, and is uniformly illuminated by the B light transmitted through the first dichroic mirror 23a. In the liquid crystal light valve 25a, the first polarization plate 25e selectively transmits the linear polarized light with a first polarization direction parallel to the sheet with respect to the B light thus input, and then leads the linear polarized light to the liquid crystal panel 26a. Here, the first polarization direction denotes the direction (an X axis direction described later) perpendicular to the intersection line between the first dichroic mirror 27a and the second dichroic mirror 27b of the cross dichroic prism 27, as described above. The liquid crystal panel 26a converts the linear polarized light with the first polarization direction input thereto into, for example, polarized light with a second polarization direction perpendicular to the sheet partially in accordance with the image signal. Further, the second polarization direction denotes the direction (a Y axis direction described later) parallel to the intersection line between the first dichroic mirror 27a and the second dichroic mirror 27b of the cross dichroic prism 27. The second polarization plate 25h selectively transmits only the linear polarized light with the second polarization direction obtained by the modulation through the liquid crystal panel 26a.

The G light liquid crystal light valve 25b disposed on the second optical path OP2 is an embodiment of the liquid crystal display device, and is provided with a liquid crystal panel 26b illuminated by the G light, a first polarization plate 25f as an entrance side polarization plate disposed on an entrance side of the liquid crystal panel 26b, a second polarization plate 25i as an exit side polarization plate disposed on an exit side of the liquid crystal panel 26b, an optical compensation plate OC disposed between the liquid crystal panel 26b and the second polarization plate 25i, and a half-wave plate 25p disposed on the "most" exit side. The liquid crystal light valve 25b is disposed on a subsequent stage of the field lens 23g provided to the color separation optical system 23, and is uniformly illuminated by the G light reflected by the second dichroic mirror 23b. In the liquid crystal light valve 25b, the first polarization plate 25f selectively transmits the linear polarized light with the first polarization direction parallel to the sheet with respect to the G light thus input, and then leads the linear polarized light to the liquid crystal panel 26b. The liquid crystal panel 26b converts the linear polarized light with the first polarization direction input thereto into, for example, polarized light with the second polarization direction perpendicular to the sheet partially in accordance with the image signal. The second polarization plate 25i selectively transmits only the linear polarized light with the second polarization direction obtained by the modulation through the liquid crystal panel 26b. The half-wave plate 25p rotates the polarization direction of the linear polarized light with the second polarization direction thus transmitted through the second polarization plate 25i 90°, thereby switching the linear polarized light with the second polarization direction to the linear polarized light with the first polarization direction parallel to the sheet.

The R light liquid crystal light valve 25c disposed on the third optical path OP3 is an embodiment of the liquid crystal display device, and is provided with a liquid crystal panel 26c illuminated by the R light, a first polarization plate 25g as an entrance side polarization plate disposed on an entrance side of the liquid crystal panel 26c, a second polarization plate 25j as an exit side polarization plate disposed on an exit side of the liquid crystal panel 26c, and an optical compensation plate OC disposed between the liquid crystal panel 26c and the second polarization plate 25j. The liquid crystal light valve 25c is disposed on a subsequent stage of the field lens 23h provided to the color separation optical system 23, and is uniformly illuminated by the R light transmitted through the second dichroic mirror 23b. In the liquid crystal light valve 25c, the first polarization plate 25g selectively transmits the linear polarized light with the first polarization direction parallel to the sheet with respect to the R light thus input, and then leads the linear polarized light to the liquid crystal panel 26c. The liquid crystal panel 26c converts the linear polarized light with the first polarization direction input thereto into, for example, polarized light with the second polarization direction perpendicular to the sheet partially in accordance with the image signal. The second polarization plate 25j selectively transmits only the linear polarized light with the second polarization direction obtained by the modulation through the liquid crystal panel 26c.

Figure 2:
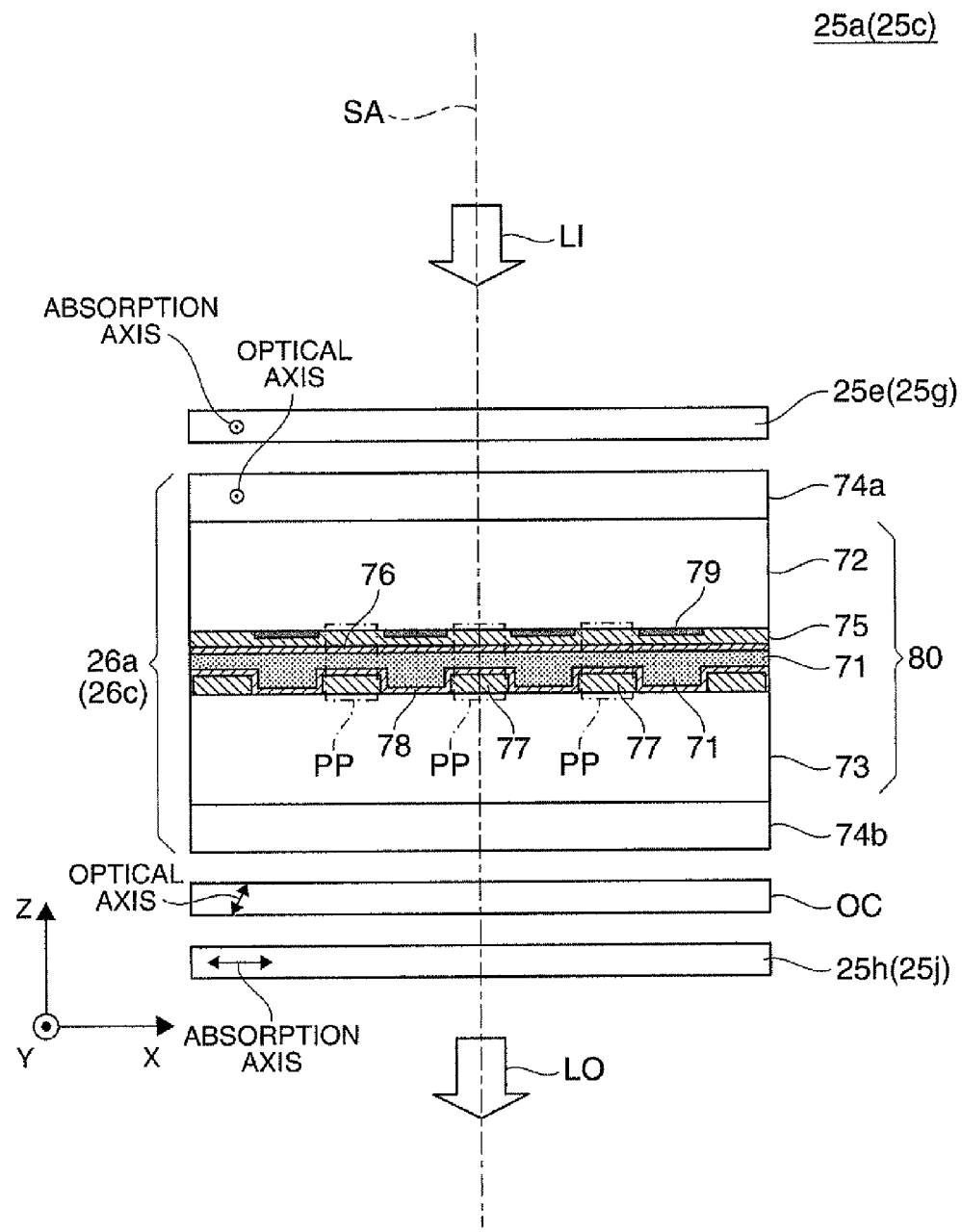
FIG. 2 is an enlarged cross-sectional view of a B light liquid crystal light valve constituting the projector shown in FIG. 1.

FIG. 2 is an enlarged cross-sectional diagram for explaining a detailed structure of the B light liquid crystal light valve 25a constituting the light modulation section 25 of the projector 10 shown in FIG. 1. The liquid crystal light valve 25a functions as the liquid crystal display device, and is composed of the liquid crystal panel 26a, a pair of polarization plates 25e, 25h disposed on both sides of the liquid crystal panel 26a, and the optical compensation plate OC disposed on the light exit side of the liquid crystal panel 26a adjacent thereto. It should be noted that in FIG. 2, the Z axis direction corresponds to a direction along which a system optical axis SA extends. Further, it is assumed that the X axis direction corresponds to the direction perpendicular to the intersection line between the first and second dichroic mirrors 27a, 27b in the cross dichroic prism 27 and the Z axis, and the Y axis direction corresponds to the direction parallel to the intersection line between the first and second dichroic mirrors 27a, 27b.

In the liquid crystal light valve 25a, the first polarization plate 25e disposed on the entrance side is arranged so that the normal lines of the entrance surface and the exit surface are parallel to a system optical axis SA, namely the Z axis. The first polarization plate 25e transmits only the P-polarized light with the first polarization direction along the X axis direction with a polarization element made, for example, of resin incorporated therein. In other words, the polarization axis or the transmission axis of the first polarization plate 25e extends in the X axis direction, while the absorption axis of the polarization plate 25e extends in the Y axis direction.

On the other hand, the second polarization plate 25h disposed on the exit side is arranged so that the normal lines of the entrance surface and the exit surface are parallel to the system optical axis SA, namely the Z axis. The second polarization plate 25h transmits only the S-polarized light with the second polarization direction along the Y axis direction using the polarization element made, for example, of resin incorporated therein, and eliminates the P-polarized light (unmodulated light) by, for example, absorption. In other words, the polarization axis or the transmission axis of the second polarization plate 25h extends in the Y axis direction, while the absorption axis of the polarization plate 25h extends in the X axis direction.

As is obvious from the explanation described above, the first polarization plate 25e and the second polarization plate 25h are disposed so as to form a cross-Nicol arrangement. The liquid crystal panel 26a located between the first and second polarization plates 25e, 25h modulates the incident light LI having entered from the first polarization plate 25e side partially from the P-polarized light to the S-polarized light pixel by pixel in accordance with an input signal, and then emits the modulated light thus modulated to the second polarization plate 25h side as outgoing light LO. As described above, the modulated light emitted from the liquid crystal light valve 25a is formed as the outgoing light LO in the S-polarization state suitable for the light combination in the cross dichroic prism 27 described later. Here, between the liquid crystal panel 26a and the second polarization plate 25h, there is disposed the optical compensation plate OC as a compensation element. The optical compensation plate OC has a flat shape, and is arranged so that the normal lines of the entrance surface and the exit surface are parallel to the system optical axis SA, namely the Z axis, similarly to the case of the first polarization plate 25e and so on. The function of the optical compensation plate OC will be described later.

The liquid crystal panel 26a between the both polarization plates 25e, 25h is provided with a first substrate 72 disposed on the entrance side and a second substrate 73 disposed on the exit side across a liquid crystal layer 71 formed of liquid crystal (i.e., vertically-aligned liquid crystal) operating in vertically-aligned mode. Each of these substrates 72, 73 has a flat shape, and is arranged so that the normal lines of the entrance surface and the exit surface are parallel to the system optical axis SA, namely the Z axis, similarly to the case of the first polarization plate 25e and so on. On the outer side of the first substrate 72, there is attached a light transmissive entrance-side dust-proof plate 74a, and on the outer side of the second substrate 73, there is attached a light transmissive exit-side dust-proof plate 74b. Each of these dust-proof plates 74a, 74b has a flat shape, and is arranged so that the normal lines of the entrance surface and the exit surface thereof are parallel to the system optical axis SA, namely the Z axis, similarly to the case of the polarization plate 25e and so on.

The entrance-side dust-proof plate 74a as a birefringent material substrate is a flat plate (a first dust-proof plate) made of quartz crystal as a birefringent material, specifically a positive uniaxial crystalline material, and the exit-side dust-proof plate 74b is a flat plate (a second dust-proof plate) made of an inorganic material with an isotropic refractive index, specifically quartz glass or neoceram.

The entrance-side dust-proof plate 74a is hewed out so that the optic axis of the quartz crystal forming the plate extends in the Y axis direction. In other words, the optic axis of the entrance-side dust-proof plate 74a is arranged to have a state parallel to the absorption axis of the polarization plate 25e. Further, the thermal conductivity of the entrance-side dust-proof plate 74a made of quartz crystal is arranged to be 5 W/m or higher, which is a higher value compared to those of quartz glass and so on. As describe above, by using the quartz crystal plate as the entrance-side dust-proof plate 74a, the cooling effect of the liquid crystal panel 26a can be enhanced. Therefore, even in the case in which the illumination light with high brightness is input to the liquid crystal panel 26a, temperature rise in the liquid crystal panel 26a can be prevented, thus the modulation characteristic of the liquid crystal panel 26a can be maintained with accuracy. Further, since the direction of the absorption axis of the first polarization plate 25e and the direction of the optic axis of the entrance-side dust-proof plate 74a made of quartz crystal are parallel to each other, it is conceivable that not only the light beam input in the state parallel to the system optical axis SA but also the light beam input in the state oblique to the system optical axis SA becomes hardly subjected to the birefringent action of the entrance-side dust-proof plate 74a in passing through the first polarization plate 25e or the entrance-side dust-proof plate 74a, and thus the degradation of the contrast or the deterioration in the view angle characteristic caused by the entrance-side dust-proof plate 74a can be prevented.

On the other hand, since the exit-side dust-proof plate 74b has an isotropic refractive index, it can be prevented to exert the retardation influence, on the light beam passing through the liquid crystal device 80, of varying the polarization state thereof. It should be noted that in the case in which the dust-proof plate is formed using a birefringent material instead of the isotropic refractive material, in accordance with the angle of the light transmitted through the birefringent material to the optic axis of the birefringent material and the angle of the polarization axis of the linear polarized light transmitted through the birefringent material to the optic axis of the birefringent material, the amount of variation of the polarization state due to the transmission of the light through the birefringent material. For example, assuming that the exit-side dust-proof plate 74b is made of the birefringent material and the optic axis thereof is perpendicular to the system optical axis SA and parallel to the transmission axis of the second polarization plate 25h, the retardation in phase caused in the birefringent material on the light input in a direction perpendicular to the optic axis is the same irrespective of the incident angle of the light. Further, in the case of substantially the same configuration, the birefringent material causes no variation in the polarization state of the linear polarized light having the polarization axis in a direction identical to the fast axis direction or the slow axis direction of the birefringent material even if the incident angle thereof becomes different. On the other hand, in substantially the same configuration, the amount of variation of the retardation in phase of the light other than the light described above caused by the birefringent material varies in accordance with the incident angle thereof. Therefore, since the polarization state of the light, which is modulated to be the polarized light to be blocked by the second polarization plate 25h in the liquid crystal device 80 in the case of, for example, black display, is varied when passing through the dust-proof plate made of the birefringent material due to the angle thereof, it becomes quite difficult to completely block the light in the second polarization plate 25h. Although there is a possibility that this causes deterioration of the contrast, since the exit-side dust-proof plate 74b has an isotropic refractive index in the case of the present embodiment, such a problem of the retardation influence is not caused by the nature thereof. Therefore, it is not required to accurately control the thickness and so on of the exit-side dust-proof plate 74b, and the exit-side dust-proof plate 74b can be made moderate in price.

In the liquid crystal panel 26a, on the surface of the first substrate 72 facing the liquid crystal layer 71, there is provided a transparent common electrode 75, on which an oriented film 76, for example, is formed. Meanwhile, on the surface of the second substrate 73 facing the liquid crystal layer 71, there are provided a plurality of transparent pixel electrodes 77 as displaying electrodes arranged in a matrix, wiring (not shown) electrically connectable to each of the transparent pixel electrodes 77, and thin film transistors (not shown) intervening between the transparent pixel electrodes 77 and the wiring, on which an oriented film 78, for example, is formed. Here, the first and second substrates 72, 73, the liquid crystal layer 71 held between these substrates, and the electrodes 75, 77 correspond to a part functioning as an optically active element, namely a liquid crystal device 80 for modulating the polarization state of the incident light LI in accordance with the input signal. Each of pixel portions PP constituting the liquid crystal device 80 includes one transparent pixel electrode 77, a part of the common electrode 75, a part of each of the oriented films 76, 78, and a part of the liquid crystal layer 71. It should be noted that between the first substrate 72 and the common electrode 75, there is disposed a lattice-shaped black matrix 79 so as to partition each of the pixel portions PP.

The optical compensation plate OC disposed on the exit side of the liquid crystal panel 26a is formed, for example, of a tabular sapphire plate as an optical material having a negative uniaxial refractive index. The optic axis of the optical compensation plate OC is parallel to a longitudinal plane, for example, including the Z axis, and extending in a certain direction between the X axis direction and the Y axis direction, and has a predetermined optic axis polar angle with respect to the Z axis. In other words, the optic axis of the optical compensation plate OC is oblique to the system optical axis SA, and is oriented in, for example, the certain direction between the X axis direction and the Y axis direction. The optical compensation plate OC has a role of preventing the view angle dependence property and the degradation of the contrast due to the pretilt of the liquid crystal layer 71.

In the liquid crystal panel 26a, namely the liquid crystal device 80 described hereinabove, the oriented films 76, 78 have a role of arranging the liquid crystalline compound forming the liquid crystal layer 71 in the condition substantially parallel to the system optical axis SA, namely the Z axis, in the condition in which no electrical field exists. It should be noted that in the case in which an appropriate electrical field in the direction along the Z axis is formed, the liquid crystalline compound forming the liquid crystal layer 71 is tilted from the state of substantially parallel to the system optical axis SA, namely the Z axis toward, for example, a predetermined direction in the XY plane. Thus, the liquid crystal layer 71 held between the pair of polarization plates 25e, 25h is operated in a normally black mode, and it becomes possible to assure the maximum light-blocking state (extinction state) in an off state in which no voltage is applied. In other words, the liquid crystal panel 26a transmits the P-polarized light without any modification when performing black display in the extinction state. Further, the liquid crystal panel 26a transmits the P-polarized light while switching the P-polarized light to the S-polarized light when performing white display in a lighting state.

The optical compensation plate OC disposed adjacent to the liquid crystal panel 26a has a role of compensating the view angle dependence property and the degradation of the contrast due to the pretilt of the liquid crystal layer 71. In other words, the sapphire plate forming the optical compensation plate OC effectively cancels the liquid crystal retardation due to the pretilt of the liquid crystal layer 71 in anticipation of the angular state of the incident light LI and the outgoing light LO. Therefore, in the manufacturing process of the optical compensation plate OC, the azimuth angle of the optic axis or the optic axis polar angle of the sapphire plate forming the optical compensation plate OC are adjusted, and the thickness thereof is adjusted.

Hereinafter, the function of the optical compensation plate OC will be explained in detail. In the case in which the liquid crystal panel 26a is in the extinction state, in the liquid crystal layer 71 to which no electrical field is applied, the optic axis of the liquid crystalline compound is not set to be precisely parallel to the Z axis, namely the system optical axis SA, but is maintained in the state of being tilted a predetermined pretilt angle with the system optical axis SA. Due to such a pretilt angle, the polarized light input to the liquid crystal panel 26a to which no voltage is applied in parallel to the system optical axis SA is subject to the retardation influence (the liquid crystal retardation), and there is caused the phenomenon that the polarization plane transmitted through the liquid crystal panel 26a is not precisely maintained, but is slightly rotated. Such a phenomenon is also caused in the polarized light input to the liquid crystal panel 26a obliquely to the system optical axis SA in the same manner. Since the light is slightly transmitted even when the liquid crystal light valve 25a becomes in the extinction state if nothing is done, the optical compensation plate OC is disposed between the pair of polarization plates 25e, 25h and adjacently to the liquid crystal panel 26a, thereby making the optical compensation plate OC perform optical compensation of the liquid crystal retardation due to the pretilt. To this end, the optic axis of the sapphire plate forming the optical compensation plate OC is not only tilted in the azimuth direction of the pretilt with respect to the system optical axis SA, but is set in the same direction normalized in the refractive index as the axial direction of the pretilt of the liquid crystal layer 71, for example, and the thickness of the sapphire plate forming the optical compensation plate OC is set to have the value for canceling the liquid crystal retardation due to the pretilt of the liquid crystal layer 71. In other words, by adding the action considering the optical thickness with respect to the refractive index ellipsoid of the positive uniaxial crystal corresponding to the pretilt of the liquid crystal layer 71 and the action considering the optical thickness with respect to the refractive index ellipsoid of the negative uniaxial crystal corresponding to the sapphire plate of the optical compensation plate OC, it is possible to approximately realize the state in which the polarized light passing through the liquid crystal panel 26a and the optical compensation plate OC apparently passes through the isotropic refractive index material, thereby achieving the optical compensation of the liquid crystal retardation.

Although the structure and the function of the B light liquid crystal light valve 25a are explained hereinabove with reference to FIG. 2 and so on, the R light liquid crystal light valve 25c also has substantially the same structure and function as those of the B light liquid crystal light valve 25a. Specifically, as shown in FIG. 2 and so on, the first polarization plate 25g can selectively transmit only the P-polarized light, the liquid crystal panel 26c can modulate the P-polarized light to the S-polarized light, and the polarization plate 25j can make the modulated light emitted from the liquid crystal light valve 25c as the outgoing light LO in the S-polarization state. In this case, the optical compensation plate OC disposed on the light exit side of the liquid crystal panel 26c prevents the view angle dependence property and the degradation of the contrast due to the pretilt of the liquid crystal layer 71.

Figure 3:
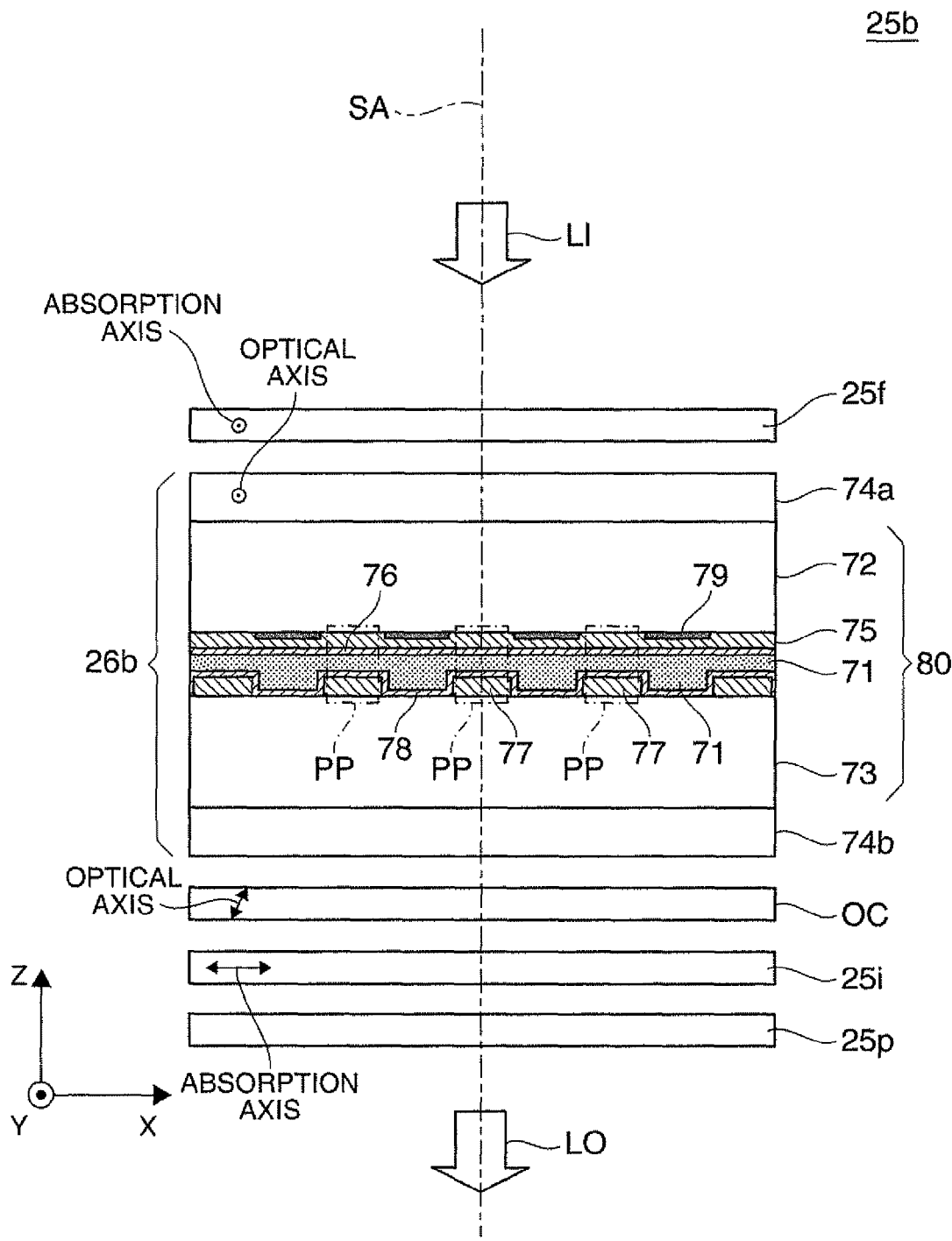
FIG. 3 is an enlarged cross-sectional view of a G light liquid crystal light valve constituting the projector shown in FIG. 1.

As shown in FIG. 3, the G light liquid crystal light valve 25b has basically the same structure and function as those of the B light liquid crystal light valve 25a and so on, but is different therefrom in that the half-wave plate 25p is added on the light exit side. Thus, the polarization plate 25f selectively transmits only the P-polarized light, and the liquid crystal panel 26b modulates the P-polarized light into the S-polarized light. Further, the polarization plate 25i transmits only the modulated light in the S-polarization state, and the half-wave plate 25p can make the modulated light emitted from the liquid crystal light valve 25b as the outgoing light LO in the P-polarization state. In this case, the optical compensation plate OC disposed on the light exit side of the liquid crystal panel 26b prevents the view angle dependence property and the degradation of the contrast due to the pretilt of the liquid crystal layer 71.

Going back to FIG. 1, the cross dichroic prism 27 corresponds to a light combining optical system and has a substantially rectangular planar shape formed of four rectangular prisms bonded with each other, and on the interfaces on which the rectangular prisms are bonded with each other, there is formed a pair of dielectric mirrors 27a, 27b intersecting with each other forming an X-shape. The both dichroic mirrors 27a, 27b are formed of respective dielectric multilayer films having characteristics different from each other. Specifically, one of the pair of dichroic mirrors, the first dichroic mirror 27a, reflects the B light while the other of the pair of dichroic mirrors, the second dichroic mirror 27b, reflects the R light. The cross dichroic prism 27 reflects the B light modulated and transmitted by the liquid crystal light valve 25a with the first dichroic mirror 27a to emit the B light rightward in the traveling direction, transmits the G light modulated and transmitted by the liquid crystal light valve 25b to emit the G light straight through the first and second dichroic mirrors 27a, 27b, and reflects the R light modulated and transmitted by the liquid crystal light valve 25c with the second dichroic mirror 27b to emit the R light leftward in the traveling direction. It should be noted that as already explained above, the first and second dichroic mirrors 27a, 27b reflect the B light and the R light in the S-polarization state perpendicular to the sheet, and the both dichroic mirrors 27a, 27b transmit the G light in the P-polarization state parallel to the sheet. Thus, the combination efficiency of the B light, G light, and R light in the cross dichroic prism 27 can be improved, and the color variation can be prevented from occurring.

As a projection section or a projection optical system, the projection lens 29 projects the color image light, which is formed by the combining operation of the cross dichroic prism 27, on the screen (not shown) with a desired magnification. In other words, a color moving image or a color still image corresponding to the drive signals or the image signals input to the respective liquid crystal panels 26a through 26c is projected on the screen with a desired magnification.

According to the projector 10 described above, by using the birefringent material with high thermal conductivity, specifically the quartz crystal, as the entrance-side dust-proof plate 74a, the cooling effect of the liquid crystal device 80 can be enhanced. Meanwhile, by using the isotropic refractive material, specifically the quartz glass or the neoceram, as the exit-side dust-proof plate 74b, it is possible to provide the retardation influence of modifying the polarization state on the light beam passing through the exit-side dust-proof plate 74b, thereby preventing the degradation of the contrast from being caused. Further, since the light transmitted through the entrance-side dust-proof plate 74a is a linear polarized light having the polarization axis perpendicular to the optic axis of the entrance-side dust-proof plate 74a not transmitted through the liquid crystal device 80 and the compensation element OC, the retardation in phase is never provided to the linear polarized light when transmitted through the entrance-side dust-proof plate 74a. Therefore, the linear polarized light from the polarization plate 25e is transmitted through the entrance-side dust-proof plate 74a having the optic axis perpendicular to the polarization axis thereof without changing the polarization state when displaying an all-black image, and the liquid crystal retardation due to the pretilt of the liquid crystal device 80 is compensated with the compensation element OC. In other words, although if the configuration in which the compensation element OC is disposed on the entrance side of the entrance-side dust-proof plate 74a is adopted, the retardation in phase is provided by the compensation element OC when displaying the all-black image, and the degradation of the contrast of the display image due to the variation in the polarization state by the exit-side dust-proof plate 74b with respect to the light other than the linear polarized light having the polarization axis parallel or perpendicular to the optic axis of the exit-side dust-proof plate 74b is caused, by adopting the layout according to the present embodiment, the degradation of the contrast can be prevented.

It should be noted that, in the projector 10 described above, although the direction of the optic axis of the entrance-side dust-proof plate 74a incorporated in the liquid crystal light valves 25a, 25b, and 25c is set to be parallel to the direction of the absorption axis of the first polarization plate 25e opposed thereto, it is also possible to set the direction of the optic axis of the entrance-side dust-proof plate 74a to be perpendicular (specifically the X axis direction) to the direction of the absorption axis of the first polarization plate 25e. Further, the entrance-side dust-proof plate 74a can be arranged to be the sapphire plate as a negative uniaxial crystalline material. In this case, the sapphire plate is hewed out so that the optic axis thereof extends in, for example, the X axis direction or the Y axis direction.

Further, in the projector 10 described above, the optical compensation plate OC incorporated in the liquid crystal light valves 25a, 25b, and 25c is not limited to the sapphire plate, but can be formed of another negative uniaxial crystalline material, and the number of plates is not limited to one, but can be two or more. Further, the optical compensation plate OC can be formed of a positive uniaxial crystalline material such as a quartz crystal. Also in this case, the optical compensation plate OC can be composed of a plurality of plates made of the positive uniaxial crystalline material.

In the projector 10 described above, the liquid crystal panels 26a, 26b, and 26c are not limited to the vertically-aligned type, but can be of the twisted nematic type. In this case, the liquid crystal layer 71 is formed of the liquid crystal acting in the twisted nematic mode. It should be noted that the twisted nematic liquid crystal panels 26a, 26b, and 26c are different in operating principle from the vertically-aligned liquid crystal panels 26a, 26b, and 26c, and the configuration of the optical compensation plate OC for compensating the pretilt is also changed to what compensates the pretilt inherent to the twisted nematic liquid crystal layer 71.

Second Embodiment

Hereinafter, a projector according to a second embodiment of the invention incorporating a modulation optical system will be explained. The projector according to the second embodiment is obtained by modifying the projector according to the first embodiment, and therefore, is the same as in the first embodiment except the part particularly explained below.

Figure 4:
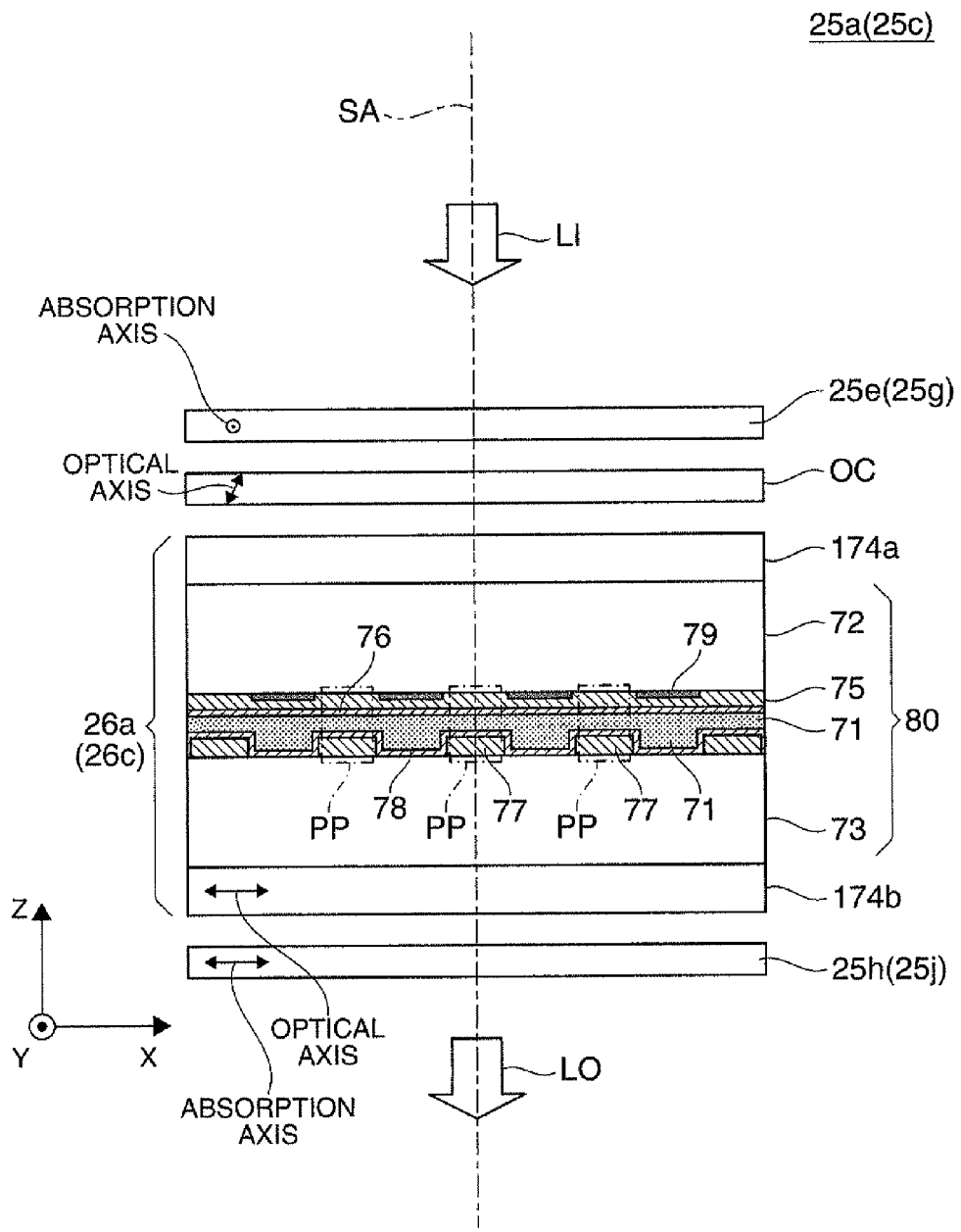
FIG. 4 is an enlarged cross-sectional view of a B light liquid crystal light valve according to a second embodiment.

FIG. 4 is an enlarged cross-sectional view for explaining the structure of the B light liquid crystal light valve 25a incorporated in the projector according to the second embodiment. In the case with the liquid crystal light valve 25a, on the outer side of the first substrate 72, there is attached a light transmissive entrance-side dust-proof plate 174a, and on the outer side of the second substrate 73, there is attached a light transmissive exit-side dust-proof plate 174b. Each of these dust-proof plates 174a, 174b has a flat shape, and is arranged so that the normal lines of the entrance surface and the exit surface thereof are parallel to the system optical axis SA, namely the Z axis, similarly to the case of the first polarization plate 25e and so on. Here, the entrance-side dust-proof plate 174a is a flat plate (a second dust-proof plate) made of an inorganic material with an isotropic refractive index, specifically quartz glass, unlike the case of the entrance-side dust-proof plate 74a shown in FIG. 2. The exit-side dust-proof plate 174b is a flat plate (a first dust-proof plate) made of a birefringent material, specifically the quartz crystal as the positive uniaxial crystalline material unlike the case of the exit-side dust proof plate 74b shown in FIG. 2. The exit-side dust-proof plate 174b is hewed out so that the optic axis of the quartz crystal forming the plate extends in the X axis direction. In other words, the optic axis of the exit-side dust-proof plate 174b is arranged to have a state perpendicular to the absorption axis of the second polarization plate 25h.

Further, between the first polarization plate 25e and the entrance-side dust-proof plate 174a of the liquid crystal panel 26a, there is disposed an optical compensation plate OC as a compensation element. The optical compensation plate OC has a flat shape, and is arranged so that the normal lines of the entrance surface and the exit surface are parallel to the system optical axis SA, namely the Z axis, similarly to the case of the first polarization plate 25e and so on. The optic axis of the optical compensation plate OC is parallel to a longitudinal plane, for example, including the Z axis, and extending in a certain direction between the X axis direction and the Y axis direction, and has a predetermined optic axis polar angle with respect to the Z axis. In other words, the optic axis of the optical compensation plate OC is oblique to the system optical axis SA, and is oriented in, for example, the certain direction between the X axis direction and the Y axis direction.

Figure 5:
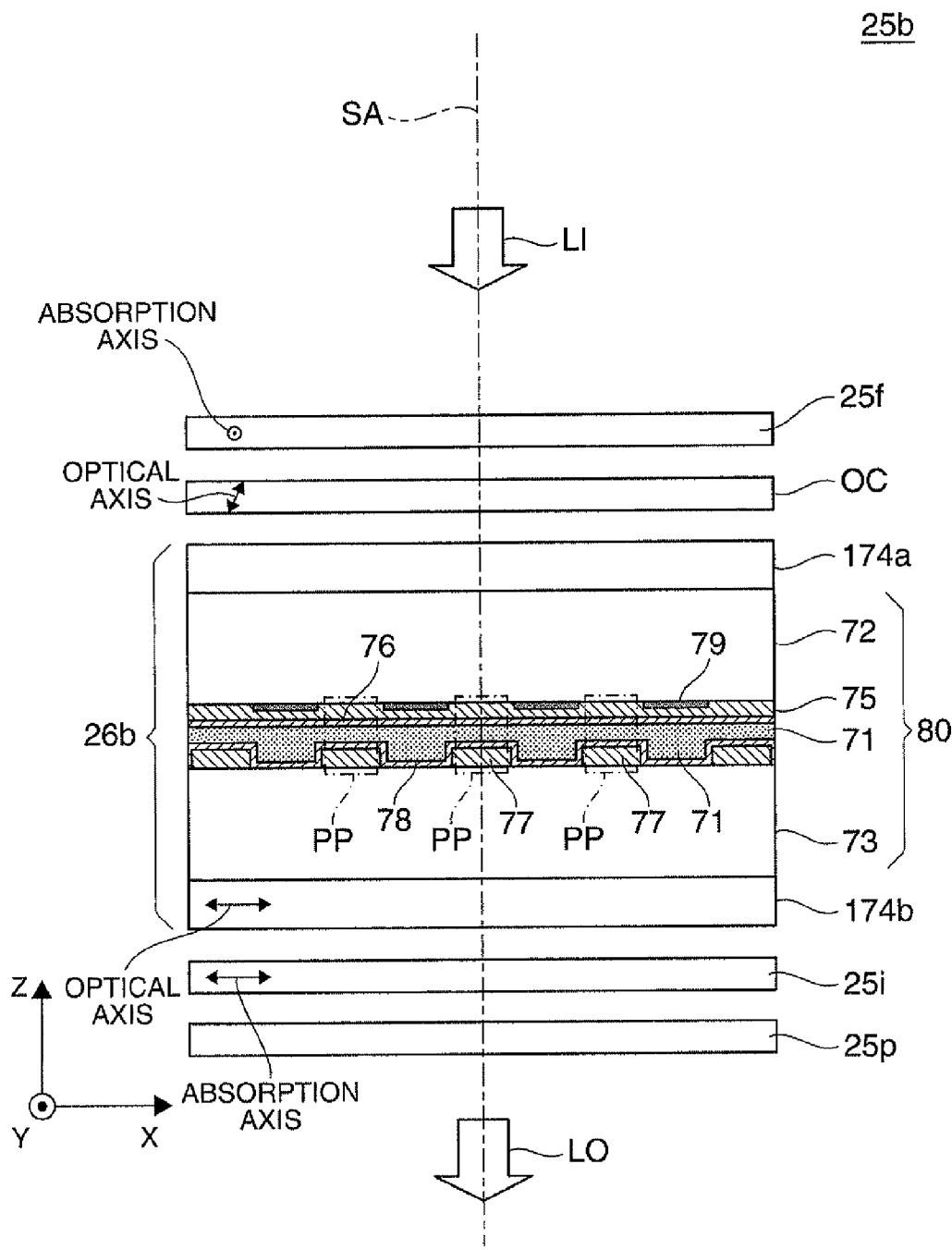
FIG. 5 is an enlarged cross-sectional view of a G light liquid crystal light valve according to the second embodiment.

It should be noted that although detailed explanations thereof will be omitted, the R light liquid crystal light valve 25c according to the present embodiment also has substantially the same structure as that of the B light liquid crystal light valve 25a. Specifically, the exit-side dust-proof plate 174b is made of the positive uniaxial crystalline material, and the optic axis thereof is disposed perpendicularly to the absorption axis of the polarization plate 25j (see FIG. 4). Further, the G light liquid crystal light valve 25b according to the present embodiment also has substantially the same structure as that of the B light liquid crystal light valve 25a. Specifically, the exit-side dust-proof plate 174b is made of the positive uniaxial crystalline material, and the optic axis thereof is disposed perpendicularly to the absorption axis of the polarization plate 25i (see FIG. 5). It should be noted that there is added the half-wave plate 25p on the light exit side of the polarization plate 25i.

According to the projector of the second embodiment, by using the birefringent material with high thermal conductivity, specifically the quartz crystal, as the exit-side dust-proof plate 174b, the cooling effect of the liquid crystal device 80 can be enhanced. Further, the light transmitted through the exit-side dust-proof plate 174b is a linear polarized light having the polarization axis parallel to the optic axis of the exit-side dust-proof plate 174b after transmitted through the compensation element OC and the liquid crystal device 80 when displaying the all-black image, there is substantially no chance to provide the retardation in phase to the linear polarized light when being transmitted through the exit-side dust-proof plate 174b. Therefore, when displaying the all-black image, the linear polarized light with the liquid crystal retardation due to the pretilt of the liquid crystal device 80 compensated with the compensation element OC is transmitted through the exit-side dust-proof plate 174b without varying the polarization state thereof. In other words, although if the configuration in which the compensation element OC is disposed on the entrance side of the exit-side dust-proof plate 174b is adopted, the retardation in phase is provided due to the retardation influence of the liquid crystal device 80 when displaying the all-black image, and the degradation of the contrast of the display image due to the variation in the polarization state by the exit-side dust-proof plate 174b with respect to the light other than the linear polarized light having the polarization axis parallel or perpendicular to the optic axis of the exit-side dust-proof plate 174b is caused, by adopting the layout according to the present embodiment, the degradation of the contrast can be prevented.

It should be noted that also in the second embodiment, it is possible to set the direction of the optic axis of the exit-side dust-proof plate 174b to be perpendicular to the direction of the absorption axis of the second polarization plate 25h. Further, the exit-side dust-proof plate 174b can be arranged to be the sapphire plate as a negative uniaxial crystalline material.

Further, also in the second embodiment, the optical compensation plate OC to be incorporated in the liquid crystal light valves 25a, 25b, and 25c can be made of the negative uniaxial crystalline material other than the sapphire or the positive uniaxial crystalline material such as the quartz crystal. In this case, the number of crystalline material plates constituting the optical compensation plate OC is not limited to one, but can be two or more.

In the second embodiment, the liquid crystal panels 26a, 26b, and 26c are not limited to the vertically-aligned type, but can be of the twisted nematic type. In this case, the liquid crystal layer 71 is formed of the liquid crystal acting in the twisted nematic mode, and the optical compensation plate OC is also changed to what compensates the pretilt inherent to the twisted nematic liquid crystal layer 71.

Third Embodiment

Hereinafter, a projector according to a third embodiment of the invention incorporating a modulation optical system will be explained. The projector according to the third embodiment is obtained by modifying the projector according to the first embodiment, and therefore, is the same as in the first embodiment except the part particularly explained below.

Figure 6:
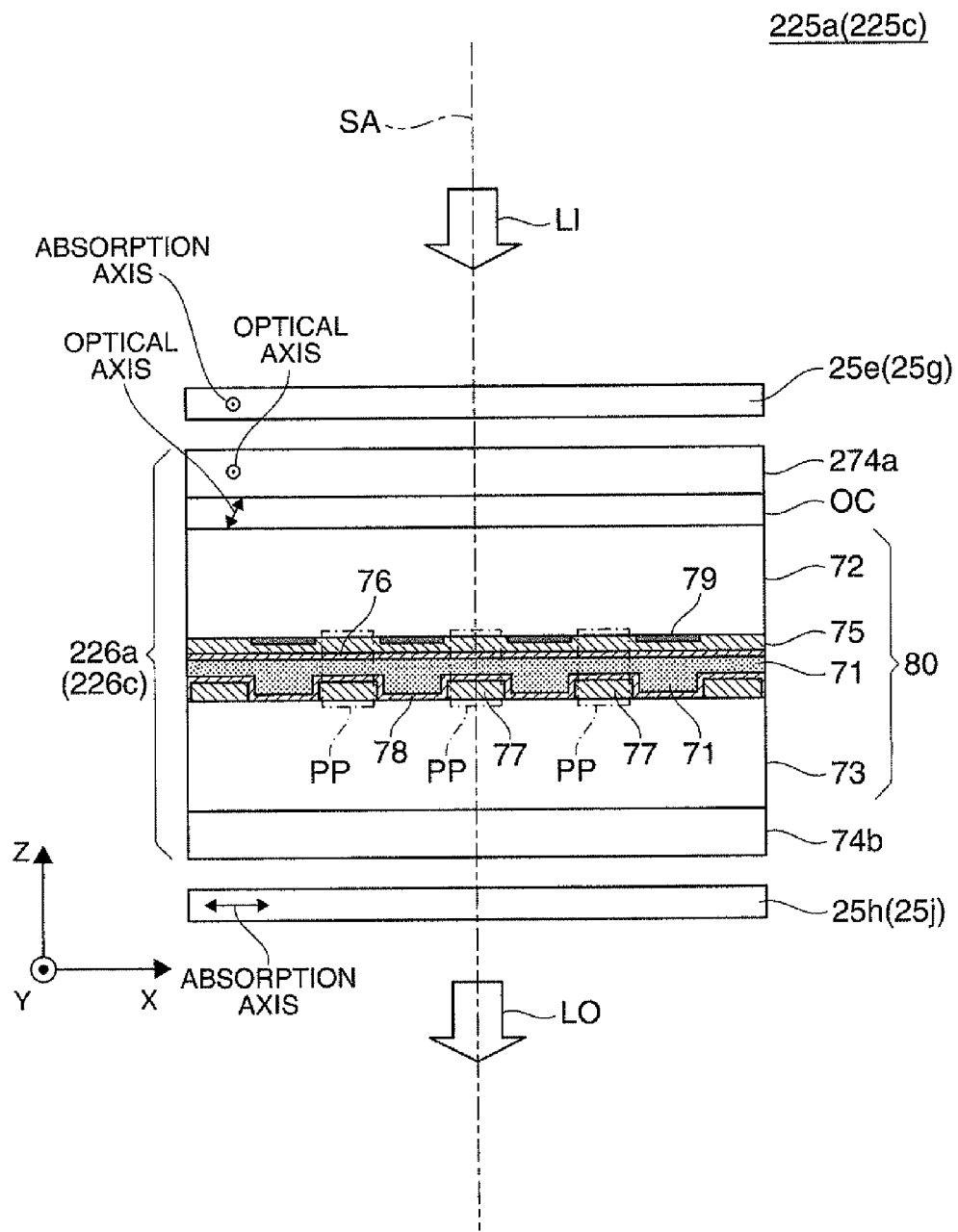
FIG. 6 is an enlarged cross-sectional view of a B light liquid crystal light valve according to a third embodiment.
Figure 7:
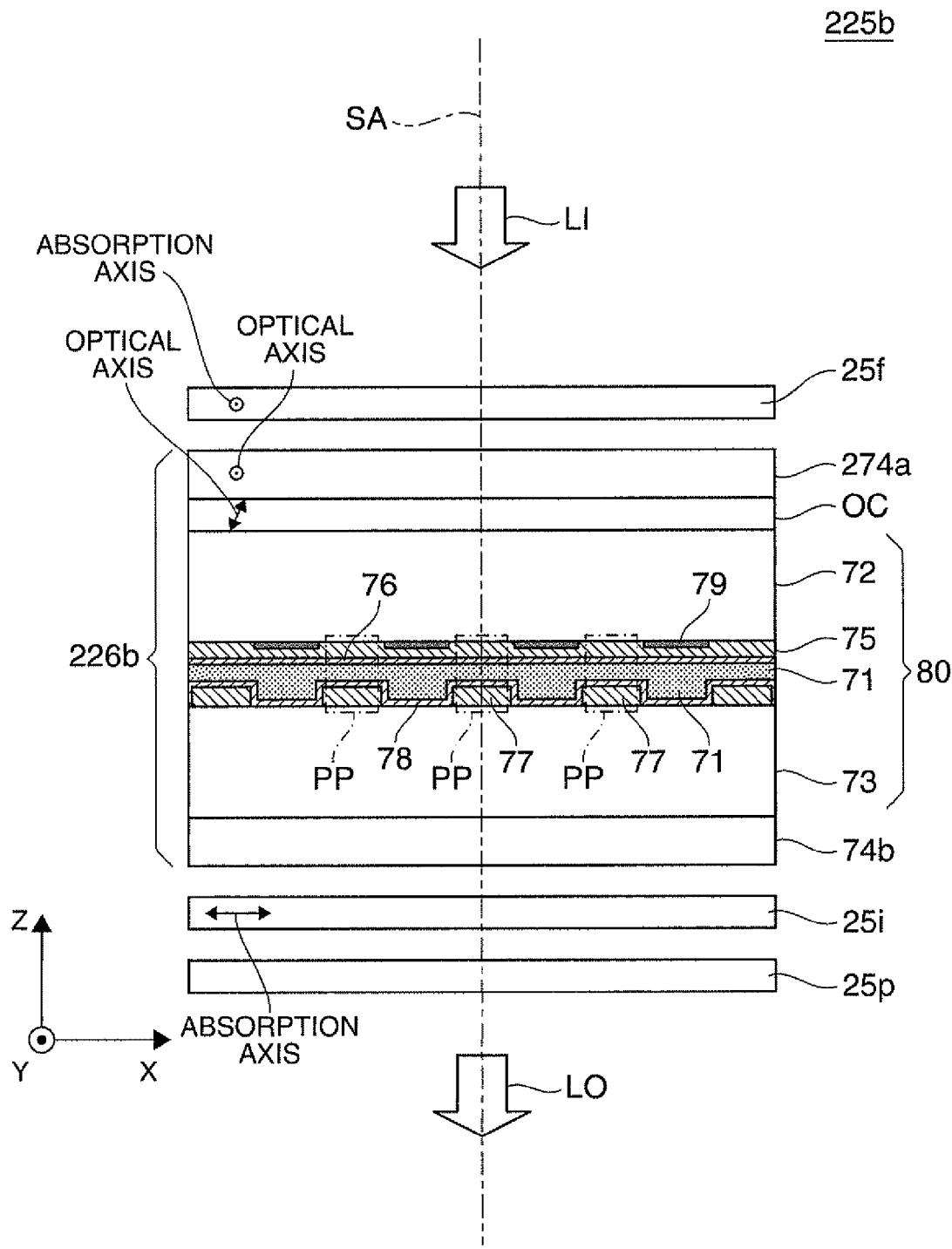
FIG. 7 is an enlarged cross-sectional view of a G light liquid crystal light valve according to the third embodiment.

FIG. 6 is an enlarged cross-sectional view for explaining the structure of the B light liquid crystal light valve 225a incorporated in the projector according to the third embodiment. In the case of the liquid crystal light valve 225a, the optical compensation element OC is incorporated in the liquid crystal panel 226a. In the specific explanations, the optical compensation element OC is attached to the light entrance surface of the liquid crystal device 80, and the entrance-side dust-proof plate 274a made of quartz crystal is attached to the light entrance surface of the optical compensation element OC on the liquid crystal device 80. In other words, the optical compensation element OC is disposed between the entrance-side dust-proof plate 274a and the liquid crystal device 80. It should be noted that the exit-side dust-proof plate 74b is a flat plate made of an inorganic material with an isotropic refractive index, specifically the quartz glass or the neoceram.

it should be noted that although detailed explanations thereof will be omitted, the R light liquid crystal light valve 225c according to the present embodiment also has substantially the same structure as that of the B light liquid crystal light valve 225a (see FIG. 6). Further, the G light liquid crystal light valve 225b according to the present embodiment also has substantially the same structure as that of the B light liquid crystal light valve 225a (see FIG. 7). It should be noted that there is added the half-wave plate 25p on the light exit side of the polarization plate 25i.

According to the projector of the third embodiment, by using the birefringent material with high thermal conductivity as the entrance-side dust-proof plate 274a, the cooling effect of the liquid crystal device can be enhanced. Further, by adopting the layout in which the optical compensation plate OC disposed between the entrance-side dust-proof plate 274a and the liquid crystal device 80, it becomes possible to make the light beam compensated with the optical compensation plate OC enter the liquid crystal device 80 while preventing the light beam from passing through the entrance-side dust-proof plate 274a. In other words, it can be prevented that the compensation operation of the optical compensation plate OC to the liquid crystal device 80 is hindered by the entrance-side dust-proof plate 274a. Thus, the degradation of the contrast of the display image can be prevented.

It should be noted that also in the third embodiment, it is possible to set the direction of the optic axis of the entrance-side dust-proof plate 274a to be perpendicular to the direction of the absorption axis of the first polarization plate 25e. Further, the entrance-side dust-proof plate 274a can be arranged to be the sapphire plate as a negative uniaxial crystalline material.

Further, also in the third embodiment, the optical compensation plate OC to be incorporated in the liquid crystal panels 226a, 226b, and 226c can be made of the negative uniaxial crystalline material other than the sapphire or the positive uniaxial crystalline material such as the quartz crystal. In this case, the number of crystalline material plates constituting the optical compensation plate OC is not limited to one, but can be two or more.

In the third embodiment, the liquid crystal panels 226a, 226b, and 226c are not limited to the vertically-aligned type, but can be of the twisted nematic type. In this case, the liquid crystal layer 71 is formed of the liquid crystal acting in the twisted nematic mode, and the optical compensation plate OC is also changed to what compensates the pretilt inherent to the twisted nematic liquid crystal layer 71.

Fourth Embodiment

Hereinafter, a projector according to a fourth embodiment of the invention incorporating a modulation optical system will be explained. The projector according to the fourth embodiment is obtained by modifying the projector according to the third embodiment, and therefore, is the same as in the third embodiment except the part particularly explained below.

Figure 8:
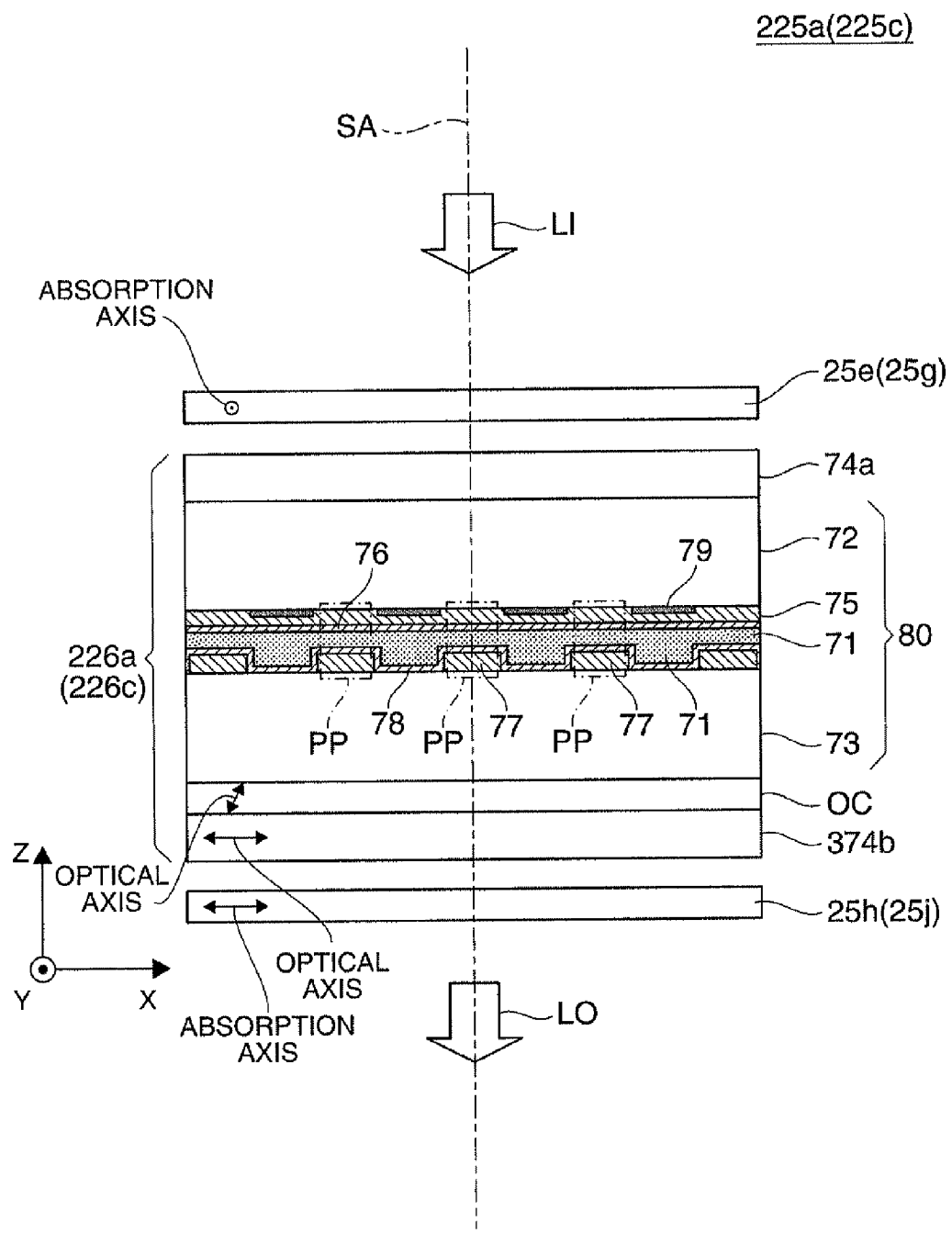
FIG. 8 is an enlarged cross-sectional view of a B light liquid crystal light valve according to a fourth embodiment.

FIG. 8 is an enlarged cross-sectional view for explaining the structure of the B light liquid crystal light valve 225a incorporated in the projector according to the fourth embodiment. In the case of the liquid crystal light valve 225a, the optical compensation element OC is attached to the light exit surface of the liquid crystal device 80, and the exit-side dust-proof plate 374b made of quartz crystal is attached to the light exit surface of the optical compensation element OC on the liquid crystal device 80. In other words, the optical compensation element OC is disposed between the liquid crystal device 80 and the exit-side dust-proof plate 374b. It should be noted that the entrance-side dust-proof plate 74a is a flat plate made of an inorganic material with an isotropic refractive index, specifically the quartz glass or the neoceram.

Figure 9:
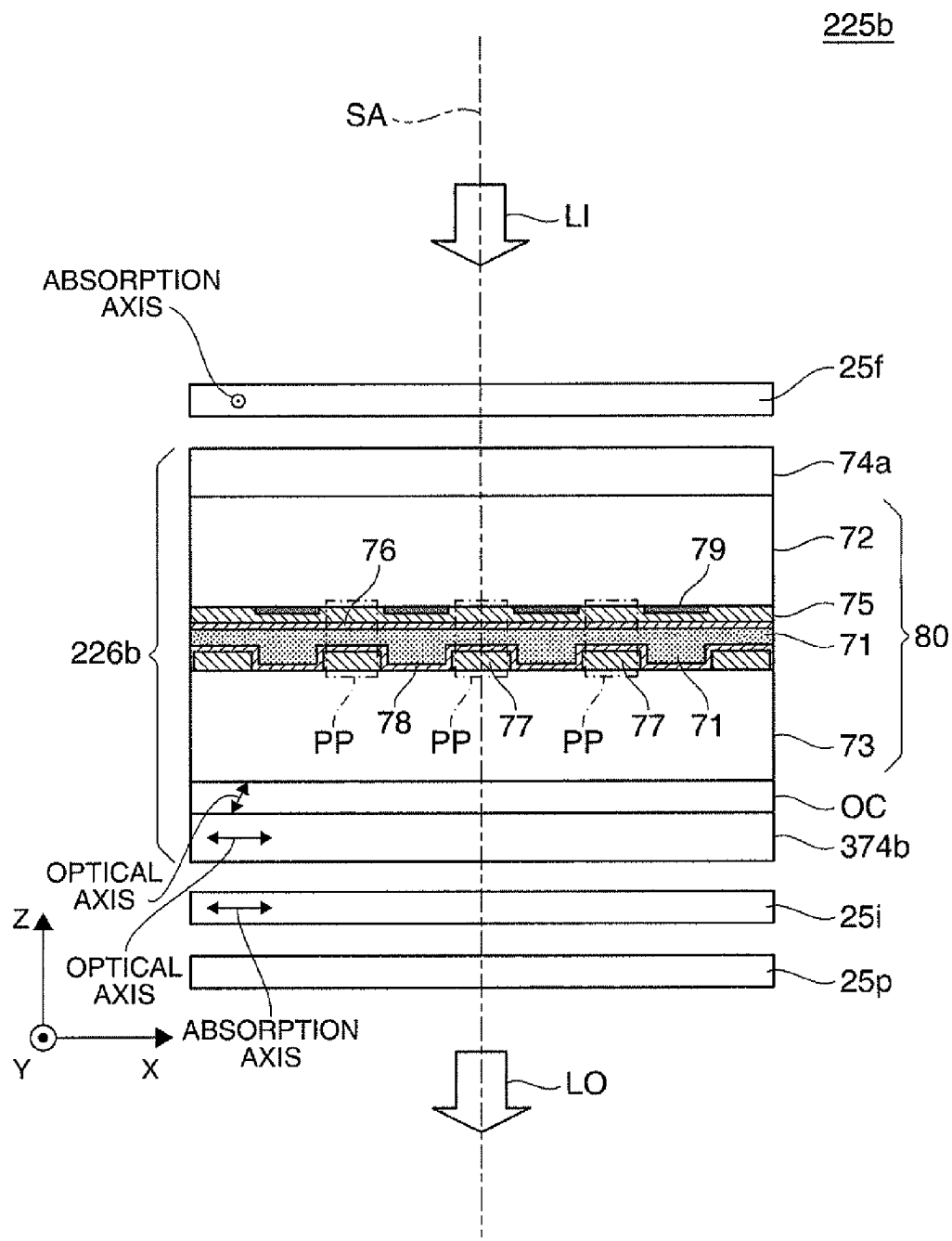
FIG. 9 is an enlarged cross-sectional view of a G light liquid crystal light valve according to the fourth embodiment.

It should be noted that although detailed explanations thereof will be omitted, the R light liquid crystal light valve 225c according to the present embodiment also has substantially the same structure as that of the B light liquid crystal light valve 225a (see FIG. 8). Further, the G light liquid crystal light valve 225b according to the present embodiment also has substantially the same structure as that of the B light liquid crystal light valve 225a (see FIG. 9). It should be noted that there is added the half-wave plate 25p on the light exit side of the polarization plate 25i.

According to the projector of the fourth embodiment, by using the birefringent material with high thermal conductivity as the exit-side dust-proof plate 374b, the cooling effect of the liquid crystal device 80 can be enhanced. Further, by adopting the layout in which the optical compensation plate OC is disposed between the liquid crystal device 80 and the exit-side dust-proof plate 374b, it is possible to make the light beam modulated in the liquid crystal device 80 enter the optical compensation plate OC prior to passing through the exit-side dust-proof plate 374b. In other words, it can be prevented that the compensation operation of the optical compensation plate OC to the liquid crystal device 80 is hindered by the exit-side dust-proof plate 374b. Thus, the degradation of the contrast of the display image can be prevented.

It should be noted that also in the fourth embodiment, it is possible to set the direction of the optic axis of the exit-side dust-proof plate 374b to be perpendicular to the direction of the absorption axis of the second polarization plate 25h. Further, the exit-side dust-proof plate 374b can be arranged to be the sapphire plate as a negative uniaxial crystalline material.

Further, also in the fourth embodiment, the optical compensation plate OC to be incorporated in the liquid crystal panels 226a, 226b, and 226c can be made of the negative uniaxial crystalline material other than the sapphire or the positive uniaxial crystalline material such as the quartz crystal. In this case, the number of crystalline material plates constituting the optical compensation plate OC is not limited to one, but can be two or more.

In the fourth embodiment, the liquid crystal panels 226a, 226b, and 226c are not limited to the vertically-aligned type, but can be of the twisted nematic type. In this case, the liquid crystal layer 71 is formed of the liquid crystal acting in the twisted nematic mode, and the optical compensation plate OC is also changed to what compensates the pretilt inherent to the twisted nematic liquid crystal layer 71.

Fifth Embodiment

Hereinafter, a projector according to a fifth embodiment of the invention incorporating a modulation optical system will be explained. The projector according to the fifth embodiment is obtained by modifying the projector according to the first embodiment, and therefore, is the same as in the first embodiment except the part particularly explained below.

Figure 10:
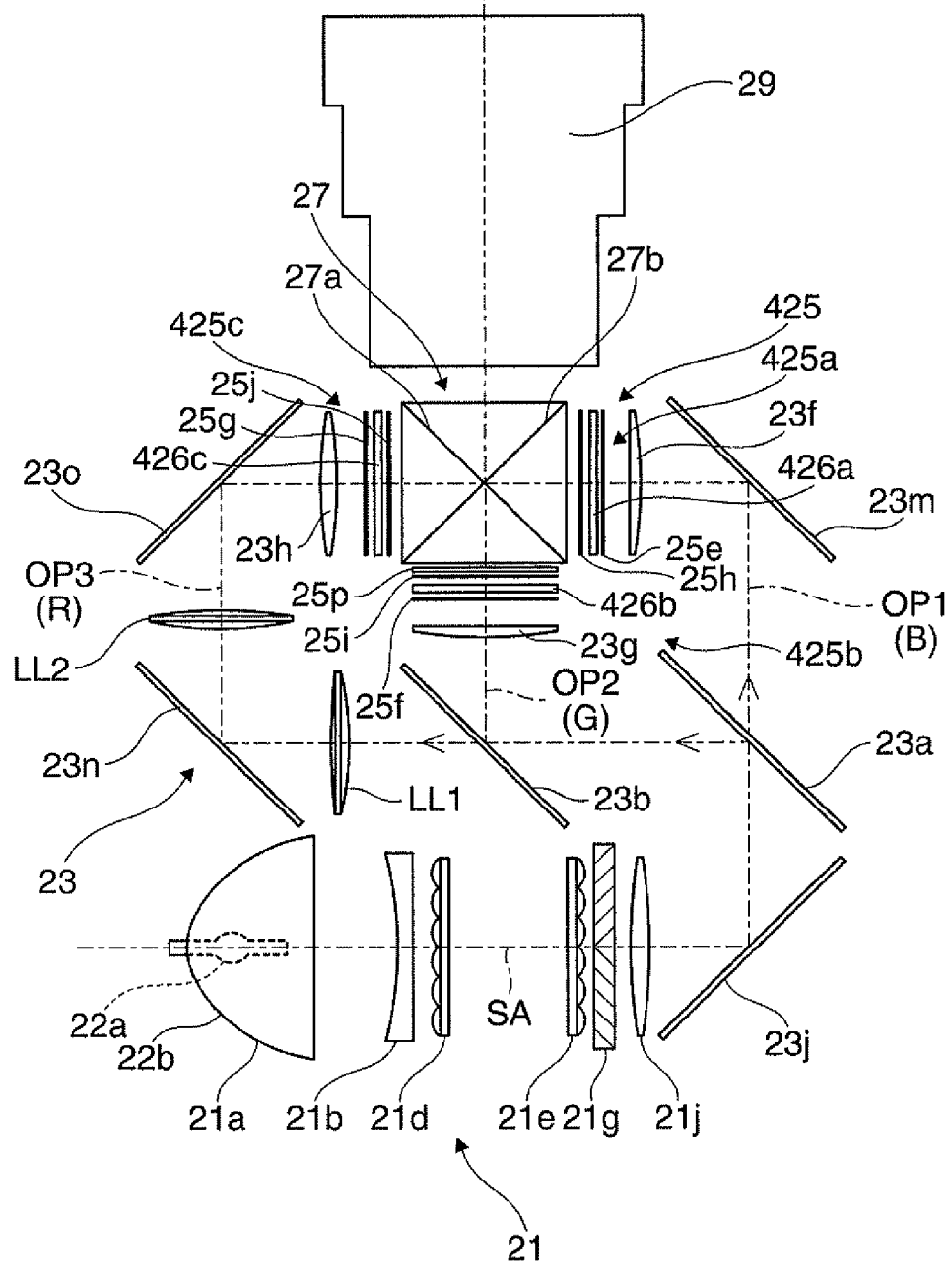
FIG. 10 is a diagram for explaining an optical system of a projector incorporating a liquid crystal display device according to a fifth embodiment.
Figure 11:
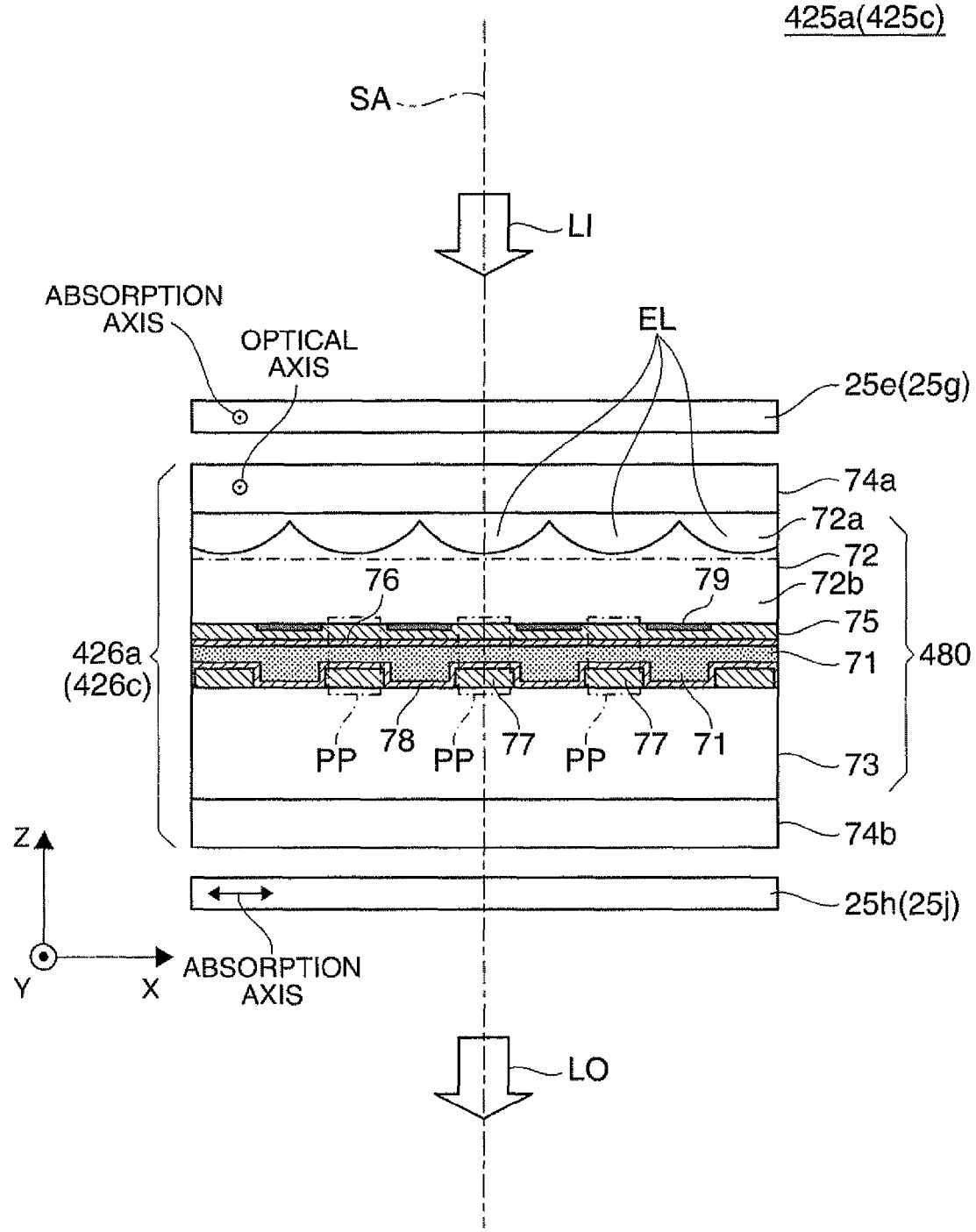
FIG. 11 is an enlarged cross-sectional view of a B light liquid crystal light valve according to a fifth embodiment.

FIG. 10 is a conceptual diagram for explaining the configuration of the optical system of the projector 110 according to the present embodiment. Further, FIG. 11 is an enlarged cross-sectional diagram for explaining a detailed structure of the B light liquid crystal light valve 425a constituting the light modulation section 425 incorporated in the projector 110 shown in FIG. 10. In the case of the liquid crystal light valve 425a, in the liquid crystal panel 426a, the first substrate 72 is provided with a microlens array 72a extending along the plane parallel to the X-Y plane, and a main body portion 72b disposed inside the microlens array 72a. The microlens array 72a has transparent pixel electrodes 77, namely predetermined patterns corresponding to the pixel portions PP, and a number of element lenses EL arranged two-dimensionally corresponding to the predetermined patterns. On the outer side of the first substrate 72 and on the light entrance side thereof, there is attached a light transmissive entrance-side dust-proof plate 74a, and on the outer side of the second substrate 73 and on the light exit side thereof, there is attached a light transmissive exit-side dust-proof plate 74b. It should be noted that the liquid crystal light valve 425a is not provided with the optical compensation plate unlike the liquid crystal light valve 25a and so on shown in FIG. 2.

By providing the microlens array 72a to the portion on the light entrance side of the first substrate 72, it becomes possible to divide the incident light LI with the element lenses EL corresponding respectively to the pixel portions PP, and to collect the incident light LI at the respective pixel portions PP. In other words, it is possible to input the incident light LI in the pixel portion PP while avoiding the black matrix 79, and it is possible to enhance the efficiency of the incident light LI in the liquid crystal device 480.

The entrance-side dust-proof plate 74a disposed on the light entrance side of the liquid crystal device 480 is a substrate made of a birefringent material, specifically a flat plate (a first dust-proof plate) made of quartz crystal as a positive uniaxial crystalline material, and the exit-side dust-proof plate 74b disposed on the light exit side is a substrate made of an inorganic material with an isotropic refractive index, specifically a flat plate (a second dust-proof plate) made of the quartz glass or the neoceram.

The entrance-side dust-proof plate 74a is made of a quarts crystal plate, thereby enhancing the cooling effect of the liquid crystal panel 426a by the principle substantially the same as in the first embodiment. On the other hand, since the exit-side dust-proof plate 74b has an isotropic refractive index, it can be prevented to exert the retardation influence, on the light beam passing through the liquid crystal device 480, of varying the polarization state thereof by the principle substantially the same as in the first embodiment. In particular, the modulated light passing through the liquid crystal layer 71 has the angle range expanded by the microlens array 72a, and if such modulated light is transmitted through the birefringent material, there is a possibility that the difference in the amount of variation of the polarization state of the light emitted through the birefringent material is enlarged in accordance with the expansion in the angle range of the incident angle, thus the contrast is degraded. However, in the present embodiment, since the exit-side dust-proof plate 74b has an isotropic refractive index, and therefore, such a problem of the retardation influence does not arise by the nature thereof. Therefore, it is not required to accurately control the thickness and so on of the exit-side dust-proof plate 74b, and the exit-side dust-proof plate 74b can be made moderate in price.

Although the structure and the function of the B light liquid crystal light valve 425a are explained hereinabove with reference to FIG. 11 and so on, the R light liquid crystal light valve 425c also has substantially the same structure and function as those of the B light liquid crystal light valve 425a. Specifically, as shown in FIG. 11 and so on, the first polarization plate 25g can selectively transmit only the P-polarized light, the liquid crystal panel 426c can modulate the P-polarized light to the S-polarized light, and the polarization plate 25j can make the modulated light emitted from the liquid crystal light valve 425c as the outgoing light LO in the S-polarization state.

Figure 12:
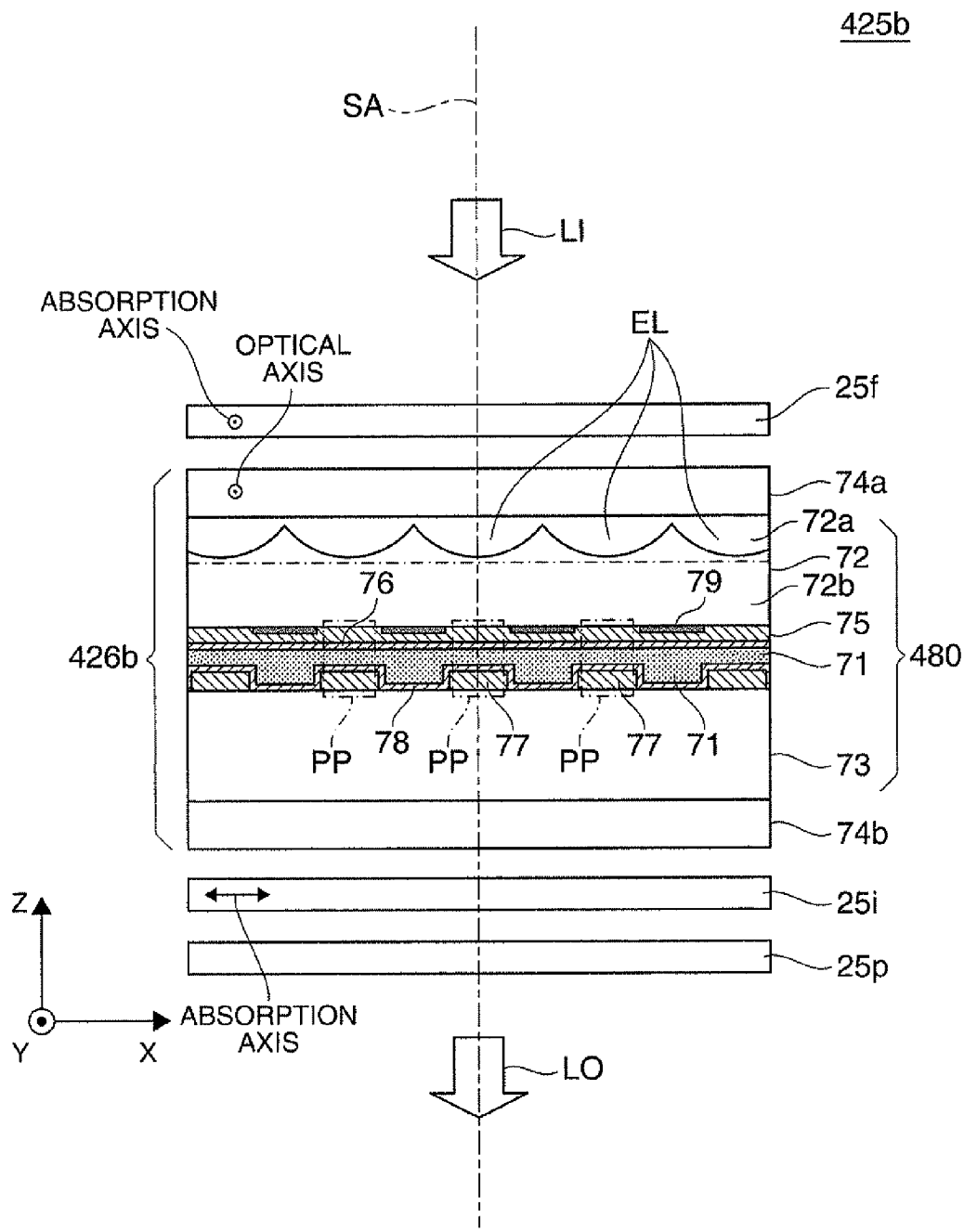
FIG. 12 is an enlarged cross-sectional view of a G light liquid crystal light valve according to the fifth embodiment.

As shown in FIG. 12, the G light liquid crystal light valve 425b has basically the same structure and function as those of the B light liquid crystal light valve 425a and so on, but is different therefrom in that the half-wave plate 25p is added on the light exit side. Thus, the polarization plate 25f selectively transmits only the P-polarized light, and the liquid crystal panel 426b modulates the P—polarized light into the S-polarized light. Further, the polarization plate 25i transmits only the modulated light in the S-polarization state, and the half-wave plate 25p can make the modulated light emitted from the liquid crystal light valve 425b as the outgoing light LO in the P-polarization state.

According to the projector 110 of the present embodiment, since the birefringent material with a high thermal conductivity as the entrance-side dust-proof plate 74a in each of the liquid crystal light valves 425a, 425b, and 425c, the cooling effect of the liquid crystal device 480 can be enhanced. Further, since the microlens array 72a is disposed on the light entrance side portion of the liquid crystal device 480, the efficiency of the incident light can be enhanced. Further, since the isotropic refractive material is used as the exit-side dust-proof plate 74b, it can be prevented to exert the retardation influence, on the light beam passing through the liquid crystal device 480, of varying the polarization state thereof. In particular, in the case in which the modulated light having the angle range expanded by the microlens array 72a is transmitted through the birefringent material, there is a possibility that the difference in the amount of the variation of the polarization state of the light transmitted through the birefringent material is enlarged in accordance with the expansion of the angle range of the incident angle, thus the contrast thereof is degraded. However, in the case of the liquid crystal light valves 425a, 425b, and 425c according to the present embodiment of the invention, since the exit-side dust-proof plate 74b is made of an isotropic refractive material, such a problem of the retardation influence does not arise by the nature thereof.

It should be noted that, in the projector 110 described above, although the direction of the optic axis of the entrance-side dust-proof plate 74a incorporated in each of the liquid crystal light valves 425a, 425b, and 425c is set to be parallel to the direction of respective one of the absorption axes of the first polarization plates 25e, 25f, and 25g opposed thereto, it is also possible to set the direction of the optic axis of the entrance-side dust-proof plate 74a to be perpendicular (specifically the X axis direction) to the direction of respective one of the absorption axes of the first polarization plates 25e, 25f, and 25g. In this case, it is arranged that the following relational expression is satisfied denoting a refractive index difference with respect to two directions perpendicular to the system optical axis SA of the entrance-side dust-proof plate 74a as Δn (=|NX−NY|), the thickness thereof in the system optical axis SA direction as d, and the wavelength of the B light used therein as λ.

$$N \leq \Delta n d/\lambda \leq N+\frac{1}{2} \quad (1)$$

(where N is an integer)
In other words, by arranging that the phase shift with respect to the optic axis direction of the entrance-side dust-proof plate 74a is equal to or smaller than a half wavelength, the phenomenon that the modulated light with the amount of modulation shifted due to the refractive index anisotropy of the entrance-side dust-proof plate 74a is emitted from the liquid crystal light valves 425a, 425b, and 425c can be prevented.

Assuming the incident light LI entering the liquid crystal light valves 425a, 425b, and 425c, if the incident light LI is parallel to the system optical axis SA, namely the Z axis, then the optical axes extending along the X axis direction or the Y axis direction of the respective refractive index ellipsoids are apparently maintained even in the case in which the polarization plates 25e, 25f, and 25g and the entrance-side dust-proof plate 74a are combined with each other. In other words, it is not caused that the entrance-side dust-proof plate 74a and so on exert the influence on the phase state of the incident light LI to vary the polarization direction thereof. However, the incident light LI entering the liquid crystal light valves 425a, 425b, and 425c has a component entering obliquely to the system optical axis, namely the Z axis, and with respect to such obliquely incident light, the optic axis of the refractive index ellipsoid of each of the first polarization plates 25e, 25f, and 25g and the optic axis of the refractive index ellipsoid of corresponding one of the entrance-side dust-proof plates 74a are not apparently maintained to be 90°. Therefore, with respect to the obliquely incident component, the entrance-side dust-proof plate 74a and so on perform actions on the phase state of the incident light LI to modulate the polarization direction. Here, since the obliquely incident component of the incident light LI influences the field angle characteristic of the contrast ratio, it is desirable that the retardation influence by the entrance-side dust-proof plate 74a and so on compensate the field angle characteristic of the liquid crystal light valves 425a, 425b, and 425c. Therefore, in the present embodiment, the thickness d and so on of the entrance-side dust-proof plate 74a is controlled in the range of the condition of the relational expression 1 described above, thereby improving the field angle characteristic of the contrast ratio.

Further, the entrance-side dust-proof plate 74a can be arranged to be the sapphire plate as a negative uniaxial crystalline material. The sapphire plate is hewed out so that the optic axis thereof extends in, for example, the X axis direction or the Y axis direction. Here, in the case in which the optic axis of the sapphire plate extends in the Y axis direction, it is not required to precisely adjust the thickness thereof on the same ground as in the case with the quartz crystal plate. However, in the case in which the optic axis of the sapphire plate extends in the X axis direction, the thickness d and so on of the entrance-side dust-proof plate 74a are adjusted so that the relational expression described below is satisfied.

$$N-\frac{1}{2} \Delta n d/\lambda \leq N \quad (2)$$

As described above, by adjusting the thickness d and so on of the entrance-side dust-proof plate 74a, it is possible to provide the characteristic with which the retardation in phase caused in the entrance-side dust-proof plate 74a cancels the retardation in phase caused in the liquid crystal light valves 425a, 425b, and 425c. Thus, the field angle characteristics of the liquid crystal light valves 425a, 425b, and 425c are compensated, thereby improving the contrast.

Sixth Embodiment

Hereinafter, a projector according to a sixth embodiment of the invention incorporating a modulation optical system will be explained. The projector according to the sixth embodiment is obtained by modifying the projector according to the fifth embodiment, and therefore, is the same as in the fifth embodiment except the part particularly explained below.

Figure 13:
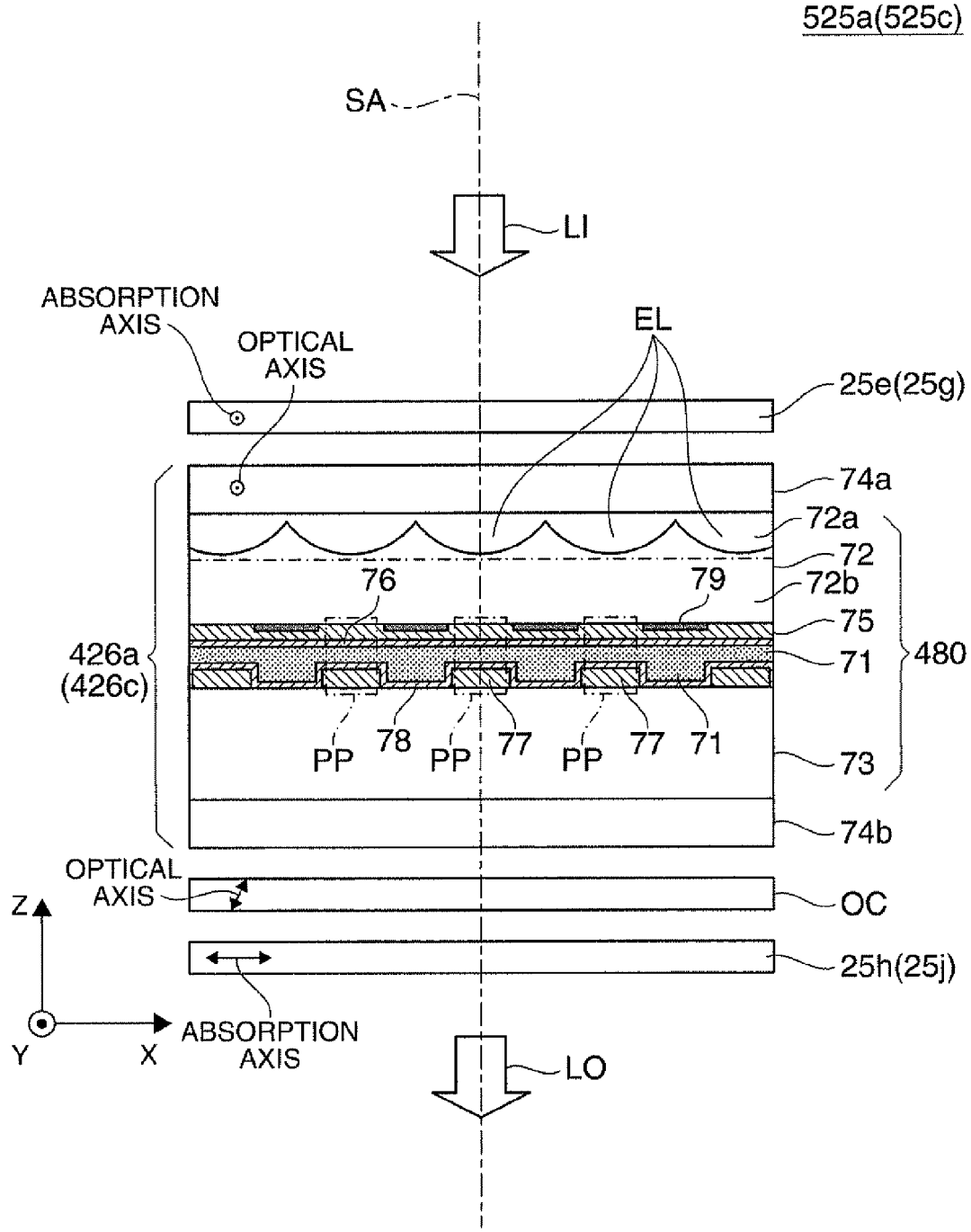
FIG. 13 is an enlarged cross-sectional view of a B light liquid crystal light valve according to a sixth embodiment.

FIG. 13 is an enlarged cross-sectional view for explaining the structure of the B light liquid crystal light valve 525a incorporated in the projector according to the sixth embodiment. In the case of the present liquid crystal light valve 525a, the optical compensation plate OC is disposed on the exit side of the liquid crystal panel 426a. The optical compensation plate OC is formed of a sapphire plate having a flat shape as an optical material having, for example, a negative uniaxial refractive index, and has a role of preventing the view angle dependence property and the degradation of the contrast due to the pretilt of the liquid crystal layer 71.

Although the structure and the function of the B light liquid crystal light valve 525a are explained hereinabove, the R light liquid crystal light valve 525c also has substantially the same structure and function as those of the B light liquid crystal light valve 525*a*. Specifically, as shown in FIG. 13 and so on, the first polarization plate 25*g* can selectively transmit only the P-polarized light, the liquid crystal panel 426*c* can modulate the P-polarized light to the S-polarized light, and the polarization plate 25*j* can make the modulated light emitted from the liquid crystal light valve 525*c* as the outgoing light LO in the S-polarization state. In this case, the optical compensation plate OC disposed on the light exit side of the liquid crystal panel 426*c* prevents the view angle dependence property and the degradation of the contrast due to the pretilt of the liquid crystal layer 71.

Figure 14:
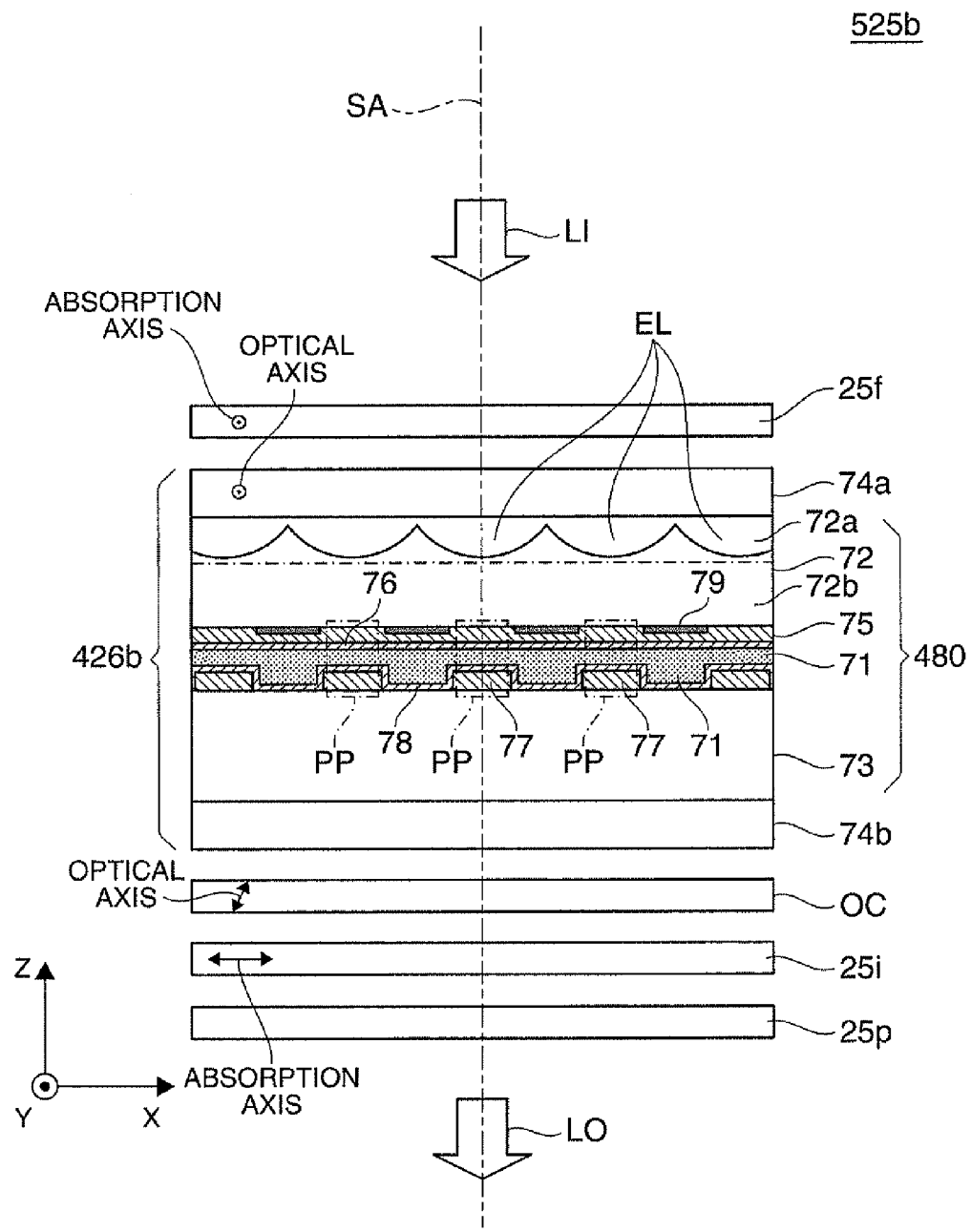
FIG. 14 is an enlarged cross-sectional view of a G light liquid crystal light valve according to the sixth embodiment.

As shown in FIG. 14, the G light liquid crystal light valve 525*b* has basically the same structure and function as those of the B light liquid crystal light valve 525*a* and so on, but is different therefrom in that the half-wave plate 25*p* is added on the light exit side. Thus, the polarization plate 25*f* selectively transmits only the P-polarized light, and the liquid crystal panel 426*b* modulates the P-polarized light into the S-polarized light. Further, the polarization plate 25*i* transmits only the modulated light in the S-polarization state, and the half-wave plate 25*p* can make the modulated light emitted from the liquid crystal light valve 525*b* as the outgoing light LO in the P-polarization state. In this case, the optical compensation plate OC disposed on the light exit side of the liquid crystal panel 426*b* prevents the view angle dependence property and the degradation of the contrast due to the pretilt of the liquid crystal layer 71.

Hereinabove, although the invention is explained along the embodiments, the invention is not limited to the embodiments described above, but can be put into practice in various forms within the scope or the spirit of the invention, and the following modifications, for example, are also possible.

Although in the embodiments described above, the polarization conversion member 21*g* converts the light emitted from the lens array 21*e* into the linear polarized light having the first polarization direction parallel to the sheet of FIG. 1, for example, and the half-wave plate 25*p* is disposed on the light exit side of the liquid crystal light valve 25*b* for the G light transmitted through the dichroic mirrors 27*a*, 27*b* of the cross dichroic prism 27, it is also possible to convert the light emitted from the lens array 21*e* into the linear polarized light having the second polarization direction perpendicular to the sheet of FIG. 1 with the polarization conversion element, and then dispose the half-wave plates on the light exit side or the light entrance side of the liquid crystal light valves 25*a* and 25*c* for the B light and the R light reflected by the dichroic mirror 27*a* or the 27*b* of the cross dichroic prism 27. In the configuration of converting the light into the second polarization direction with the polarization conversion element, the reflecting efficiency of the light inside the color separation optical system 23 is enhanced, thus the efficiency of the light is improved.

In other words, although in the first, second, and sixth embodiments, the optical compensation plats OC is disposed on the side opposed to the liquid crystal device 80, 480 across the dust-proof plats 74*b*, 174*a* formed of the inorganic material having the isotropic refractive index, it is also possible to dispose the optical compensation plate OC between the dust-proof plate 74*b*, 174*a* and the liquid crystal device 80, 480. In this case, the dust-proof plate 74*b*, 174*a* can be replaced with a birefringent material such as a quartz crystal plate or sapphire having the optic axis in the X axis direction or the Y axis direction in accordance with the absorption axis of the polarization plate 25*e*, 25*h*.

Further, in the first and the third embodiments, it is also possible to set the direction of the optic axis of the entrance-side dust-proof plate 74*a*, 274*a* made of the birefringent material to be perpendicular (specifically, the X-axis direction) to the direction of the absorption axis of one of the first polarization plates 25*e*, 25*f*, 25*g* opposed thereto. It should be noted that also in the second and fourth embodiments, it is possible to set the direction of the optic axis of the exit-side dust-proof plate 174*b*, 374*b* to be perpendicular to the direction of the absorption axis of corresponding one of the second polarization plates 25*h*, 25*i*, and 25*j* in a similar manner. In either case, by adjusting the thickness and so on of the dust-proof plate in a similar manner to the case of the fifth embodiment, it is possible to arrange that the birefringent action is hardly exerted on the dust-proof plate when the light passes through the polarization plates.

Further, although in the projector 10, 110 of the first and fifth embodiments described above, the light source device 21 is composed of the light source lamp 21*a*, the pair of lens arrays 21*d*, 21*e*, the polarization conversion member 21*g*, and the overlapping lens 211, the lens arrays 21*d*, 21*e* and so on can be eliminated, and the light source lamp 21*a* can be replaced with another light source such as an LED.

Although in the first and fifth embodiments described above, for example, only the example of the projector 10, 110 using three liquid crystal light valves 25*a* through 25*c*, 425*a* through 425*c* is cited, the invention can also be applied to a projector using one or two liquid crystal light valve(s) or a projector using four or more liquid crystal light valves.

Although in the embodiments described above, only an example of the front projector for performing projection from the direction in which the screen is observed is cited, the invention can be applied to rear projectors for performing projection from the direction opposite to the direction in which the screen is observed.

The entire disclosure of Japanese Patent Application No. 2009-011680, filed Jan. 22, 2009 and the entire disclosure of Japanese Patent Application No. 2009-011681, filed Jan. 22, 2009 are expressly incorporated by reference herein.

What is claimed is:

1. A liquid crystal display device comprising:
    a liquid crystal device;
    a first dust-proof plate made of a birefringent material, and disposed on a light entrance side of the liquid crystal device; and
    a second dust-proof plate made of an isotropic refractive material, and is disposed on the other of the light entrance side and the light exit side of the liquid crystal device,
    the liquid crystal device further including a microlens array at a portion on the light entrance side.

2. The liquid crystal display device according to claim 1, further comprising:
    a compensation element disposed across the liquid crystal device from the first dust-proof plate.

3. The liquid crystal display device according to claim 1, wherein
    the first dust-proof plate is made of one of quartz crystal and sapphire.

4. The liquid crystal display device according to claim 1, wherein
    the liquid crystal device has a pair of substrates adapted to hold a liquid crystal layer on both sides of the liquid crystal layer, and a displaying electrode formed on one of the pair of substrates.

5. The liquid crystal display device according to claim 1, further comprising:
    an entrance-side polarization plate disposed on a light entrance side of the liquid crystal device; and an exit-side polarization plate disposed on a light exit side of the liquid crystal device across the liquid crystal device, the first dust-proof plate, and the second dust-proof plate from the entrance-side polarization plate.

6. The liquid crystal display device according to claim 5, wherein a direction of an optic axis of the first dust-proof plate is one of parallel and perpendicular to a direction of an absorption axis of the entrance-side polarization plate.

7. A projector comprising:

the liquid crystal display device according to claim 1;

an illumination device adapted to illuminate the liquid crystal display device; and a projection lens adapted to project an image formed by the liquid crystal display device.

8. The projector according to claim 7, further comprising:

a compensation element disposed across the liquid crystal device from the first dust-proof plate.

9. The projector according to claim 7, wherein the first dust-proof plate is made of one of quartz crystal and sapphire.

10. The projector according to claim 7, wherein the liquid crystal device has a pair of substrates adapted to hold a liquid crystal layer on both sides of the liquid crystal layer, and a displaying electrode formed on one of the pair of substrates.

11. The projector according to claim 7, further comprising:

an entrance-side polarization plate disposed on a light entrance side of the liquid crystal device; and an exit-side polarization plate disposed on a light exit side of the liquid crystal device across the liquid crystal device, the first dust-proof plate, and the second dust-proof plate from the entrance-side polarization plate.

12. The projector according to claim 11, wherein a direction of an optic axis of the first dust-proof plate is one of parallel and perpendicular to a direction of an absorption axis of the entrance-side polarization plate.

* * * * *